United States Patent
Yamaguchi

(10) Patent No.: US 11,474,595 B2
(45) Date of Patent: Oct. 18, 2022

(54) DISPLAY DEVICE AND DISPLAY DEVICE CONTROL METHOD

(71) Applicant: CANON KABUSHIKI KAISHA, Tokyo (JP)

(72) Inventor: Hiroichi Yamaguchi, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/842,836

(22) Filed: Apr. 8, 2020

(65) Prior Publication Data
US 2020/0241633 A1    Jul. 30, 2020

Related U.S. Application Data

(63) Continuation of application No. PCT/JP2018/035692, filed on Sep. 26, 2018.

(30) Foreign Application Priority Data

Nov. 2, 2017 (JP) .............................. JP2017-213224

(51) Int. Cl.
*G09G 5/00* (2006.01)
*G06F 3/01* (2006.01)
*G06F 3/16* (2006.01)
*G06T 11/00* (2006.01)
*G08B 21/02* (2006.01)
*H04N 5/265* (2006.01)

(52) U.S. Cl.
CPC ............... *G06F 3/012* (2013.01); *G06F 3/16* (2013.01); *G06T 11/00* (2013.01); *G08B 21/02* (2013.01); *H04N 5/265* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | |
|---|---|---|---|
| 7,538,768 B2 | 5/2009 | Kiyokawa et al. |
| 9,001,155 B2 | 4/2015 | Tamaru |
| 9,191,658 B2 | 11/2015 | Kato et al. |
| 9,805,691 B2 | 10/2017 | Umehara et al. |
| 10,080,955 B2 | 9/2018 | Asami |
| 10,269,132 B2 | 4/2019 | Kawamoto et al. |
| 2004/0239685 A1 | 12/2004 | Kiyokawa et al. |
| 2013/0235169 A1 | 9/2013 | Kato et al. |
| 2013/0241955 A1 | 9/2013 | Tamaru |

(Continued)

FOREIGN PATENT DOCUMENTS

| | | |
|---|---|---|
| CN | 101034309 A | 9/2007 |
| CN | 103202010 A | 7/2013 |

(Continued)

OTHER PUBLICATIONS

Dec. 25, 2018 International Search Report in International Patent Appln. No. PCT/JP2018/035692.

(Continued)

*Primary Examiner* — Gordon G Liu
(74) *Attorney, Agent, or Firm* — Venable LLP

(57) ABSTRACT

Movement information indicating movement of the display device is obtained, and a warning is notified when the movement information is information indicating a sickness-inducing movement set in advance as movement likely to induce motion sickness.

18 Claims, 21 Drawing Sheets

(56) References Cited

U.S. PATENT DOCUMENTS

| | | | |
|---|---|---|---|
| 2014/0176296 A1* | 6/2014 | Morgan | G06F 3/011 340/4.13 |
| 2016/0228771 A1 | 8/2016 | Watson | |
| 2017/0075417 A1 | 3/2017 | Asami | |
| 2017/0111636 A1 | 4/2017 | Hasegawa et al. | |
| 2017/0136842 A1* | 5/2017 | Anderson | B60G 17/0165 |
| 2017/0278262 A1 | 9/2017 | Kawamoto et al. | |
| 2017/0278306 A1* | 9/2017 | Rico | G02B 27/0093 |
| 2018/0096517 A1* | 4/2018 | Mallinson | G06N 3/08 |
| 2020/0241633 A1 | 7/2020 | Yamaguchi | |

FOREIGN PATENT DOCUMENTS

| | | |
|---|---|---|
| CN | 103380625 A | 10/2013 |
| CN | 106339084 A | 1/2017 |
| JP | 2000-339490 A | 12/2000 |
| JP | 2003-185967 A | 7/2003 |
| JP | 2016-031439 A | 3/2016 |
| JP | 2017-054457 A | 3/2017 |
| JP | 2017-059196 A | 3/2017 |
| JP | 6934806 B | 9/2021 |
| WO | 2016/017245 A1 | 2/2016 |

OTHER PUBLICATIONS

Dec. 20, 2021 Chinese Official Action in Chinese Patent Appln. No. 201880069813.2.
Jun. 13, 2022 Office Action in Japanese counterpart Application No. 2021-137366.

* cited by examiner

FIG. 9

| SICKNESS-INDUCING MOVEMENT | LIKELIHOOD TO INDUCE MOTION SICKNESS | DETECTION ORDER |
|---|---|---|
| FACING DOWNWARD | SICKENS GRADUALLY | 4 |
| ROLL MOVEMENT | SICKENS QUICKLY | 2 |
| SUDDEN ACCELERATION | SICKENS GRADUALLY | 3 |
| DUAL-AXIS ROTATION | SICKENS QUICKLY | 1 |

| SICKNESS-INDUCING MOVEMENT | LIKELIHOOD TO INDUCE MOTION SICKNESS | DETECTION ORDER |
|---|---|---|
| FACING DOWNWARD | SICKENS GRADUALLY | 5 |
| ROLL MOVEMENT | SICKENS QUICKLY | 2 |
| SUDDEN ACCELERATION | SICKENS GRADUALLY | 3 |
| DUAL-AXIS ROTATION | SICKENS QUICKLY | 1 |
| WALKING WHILE FACING DOWNWARD | SICKENS GRADUALLY | 4 |

F I G. 16

| SICKNESS-INDUCING MOVEMENT | LIKELIHOOD TO INDUCE MOTION SICKNESS | DETECTION ORDER | SCORE |
|---|---|---|---|
| FACING DOWNWARD | SICKENS GRADUALLY | 5 | 0.5 |
| ROLL MOVEMENT | SICKENS QUICKLY | 2 | 5 |
| SUDDEN ACCELERATION | SICKENS GRADUALLY | 3 | 1 |
| DUAL-AXIS ROTATION | SICKENS QUICKLY | 1 | 10 |
| WALKING WHILE FACING DOWNWARD | SICKENS GRADUALLY | 4 | 1 |

FIG. 17

| TIME | MOVEMENT | SCORE OF MOVEMENT | CUMULATIVE SCORE |
|---|---|---|---|
| t | | 5 | 5 |
| t+1 | | 1 | 6 |
| t+2 | | 1 | 7 |
| t+3 | | 1 | 8 |
| t+4 | | 1 | 9 |
| t+5 | | 1 | 10 |

FIG. 21A

| USER | SICKNESS-INDUCING MOVEMENT | LIKELIHOOD TO INDUCE MOTION SICKNESS | DETECTION ORDER | SCORE |
|---|---|---|---|---|
| MR. A | FACING DOWNWARD | SICKENS GRADUALLY | 5 | 0.5 |
| | ROLL MOVEMENT | SICKENS QUICKLY | 2 | 5 |
| | SUDDEN ACCELERATION | SICKENS GRADUALLY | 3 | 1 |
| | DUAL-AXIS ROTATION | SICKENS QUICKLY | 1 | 10 |
| | WALKING WHILE FACING DOWNWARD | SICKENS GRADUALLY | 4 | 0.5 |
| MS. B | FACING DOWNWARD | SICKENS GRADUALLY | 4 | 0.5 |
| | ROLL MOVEMENT | SICKENS QUICKLY | 3 | 5 |
| | SUDDEN ACCELERATION | SICKENS GRADUALLY | 5 | 0 |
| | DUAL-AXIS ROTATION | SICKENS QUICKLY | 1 | 8 |
| | WALKING WHILE FACING DOWNWARD | SICKENS GRADUALLY | 2 | 5 |

FIG. 21B

| USER | CLASS | SICKNESS-INDUCING MOVEMENT | LIKELIHOOD TO INDUCE MOTION SICKNESS | DETECTION ORDER | SCORE |
|---|---|---|---|---|---|
| MR. A, MS. C | BEGINNER | FACING DOWNWARD | SICKENS GRADUALLY | 5 | 0.5 |
| | | ROLL MOVEMENT | SICKENS QUICKLY | 2 | 5 |
| | | SUDDEN ACCELERATION | SICKENS GRADUALLY | 3 | 1 |
| | | DUAL-AXIS ROTATION | SICKENS QUICKLY | 1 | 10 |
| | | WALKING WHILE FACING DOWNWARD | SICKENS GRADUALLY | 4 | 1 |
| MS. B, MR. D | EXPERIENCED USER | FACING DOWNWARD | SICKENS GRADUALLY | 5 | 0 |
| | | ROLL MOVEMENT | SICKENS QUICKLY | 2 | 2 |
| | | SUDDEN ACCELERATION | SICKENS GRADUALLY | 3 | 0 |
| | | DUAL-AXIS ROTATION | SICKENS QUICKLY | 1 | 5 |
| | | WALKING WHILE FACING DOWNWARD | SICKENS GRADUALLY | 4 | 0 |

DISPLAY DEVICE AND DISPLAY DEVICE CONTROL METHOD

CROSS-REFERENCE TO RELATED APPLICATIONS

This application is a Continuation of International Patent Application No. PCT/JP2018/035692, filed Sep. 26, 2018, which claims the benefit of Japanese Patent Application No. 2017-213224, filed Nov. 2, 2017, both of which are hereby incorporated by reference herein in their entirety.

BACKGROUND OF THE INVENTION

Field of the Invention

The present invention relates to a technique for presenting a mixed reality space which is a composite space of a real space and a virtual space.

Background Art

In recent years, a technique known as mixed reality (MR) has been gaining attention as a technique that seamlessly combines the real world with the virtual world in real time. The following technique is known as one such MR technique. Using a video see-through-type HMD (head-mounted display), an image of an object that substantially coincides with an object observed from the pupil position of the HMD user is captured using a video camera or the like. CG (computer graphics) are then superimposed on the image that has been captured, and the resulting image is presented to the HMD user.

With a video see-through-type HMD, an image of an object is captured, using a charge-coupled device such as a CCD, to obtain digital image data of the object, and an MR image (mixed reality space image) in which a CG image is superimposed on the digital image data is then displayed to a wearer through a display device such as a liquid-crystal or organic EL device. Aside from the HMD, there is also an external device, and a captured image captured by the HMD is sent from the HMD to the external device. The external device calculates the position and orientation of the HMD from the captured image received from the HMD, generates a superimposed image, in which a CG image is superimposed on the captured image, on the basis of the calculation result, and sends the superimposed image to the HMD. The HMD then displays the superimposed image received from the external device. By wearing the HMD, the HMD user can experience an MR space.

Depending on the HMD user, visually-induced motion sickness may arise when the user is wearing and immersed in the HMD. Patent Literature 1 proposes a technique for reducing visually-induced motion sickness by suppressing the amount of information visually recognized by an HMD wearer.

Patent Literature 1 discloses a process for suppressing the amount of visually-recognized information when a motion amount of a virtual camera is greater than or equal to a predetermined amount. However, with the technique disclosed in Patent Literature 1, there have been situations where the HMD user does not recognize operations likely to cause visually-induced motion sickness, and has therefore experienced such visually-induced motion sickness.

Having been achieved in light of such problems, the present invention provides a technique for reducing visually-induced motion sickness in a user viewing a display device.

CITATION LIST

Patent Literature

Patent Literature 1: Japanese Patent Laid-Open No. 2017-059196

SUMMARY OF THE INVENTION

According to the first aspect of the present invention, there is provided a display device comprising: a obtaining unit configured to obtain movement information indicating movement of the display device; and a notifying unit configured to notify of a warning when the movement information is information indicating a sickness-inducing movement set in advance as movement likely to induce motion sickness.

According to the second aspect of the present invention, there is provided a control method for a display device, the method comprising: obtaining movement information indicating movement of the display device; and notifying of a warning when the movement information is information indicating a sickness-inducing movement set in advance as movement likely to induce motion sickness.

Further features of the present invention will become apparent from the following description of exemplary embodiments with reference to the attached drawings.

BRIEF DESCRIPTION OF THE DRAWINGS

FIG. 9 is a diagram illustrating an example of the configuration of information stored in a movement definition unit 1301.

FIG. 16 is a diagram illustrating an example of the configuration of a table held in a score unit 2501.

FIG. 17 is a diagram illustrating a third embodiment.

FIG. 21A is a diagram illustrating an example of the configuration of information held in a score unit 3001.

FIG. 21B is a diagram illustrating an example of the configuration of information held in the score unit 3001.

DESCRIPTION OF THE EMBODIMENTS

Embodiments of the present invention will be described hereinafter with reference to the appended drawings. Note that the embodiments described hereinafter are merely specific examples of ways to carry out the present invention, and are specific embodiments of the configurations disclosed in the scope of patent claims.

First Embodiment

The present embodiment will describe an example of a system that presents a composite image obtained by compositing an image of a real space and an image of a virtual space (that is, an image of a mixed reality space) in a head-mounted display device, and that notifies of a warning when movement of the head-mounted display device corresponds to movement likely to induce motion sickness.

Figure 1:
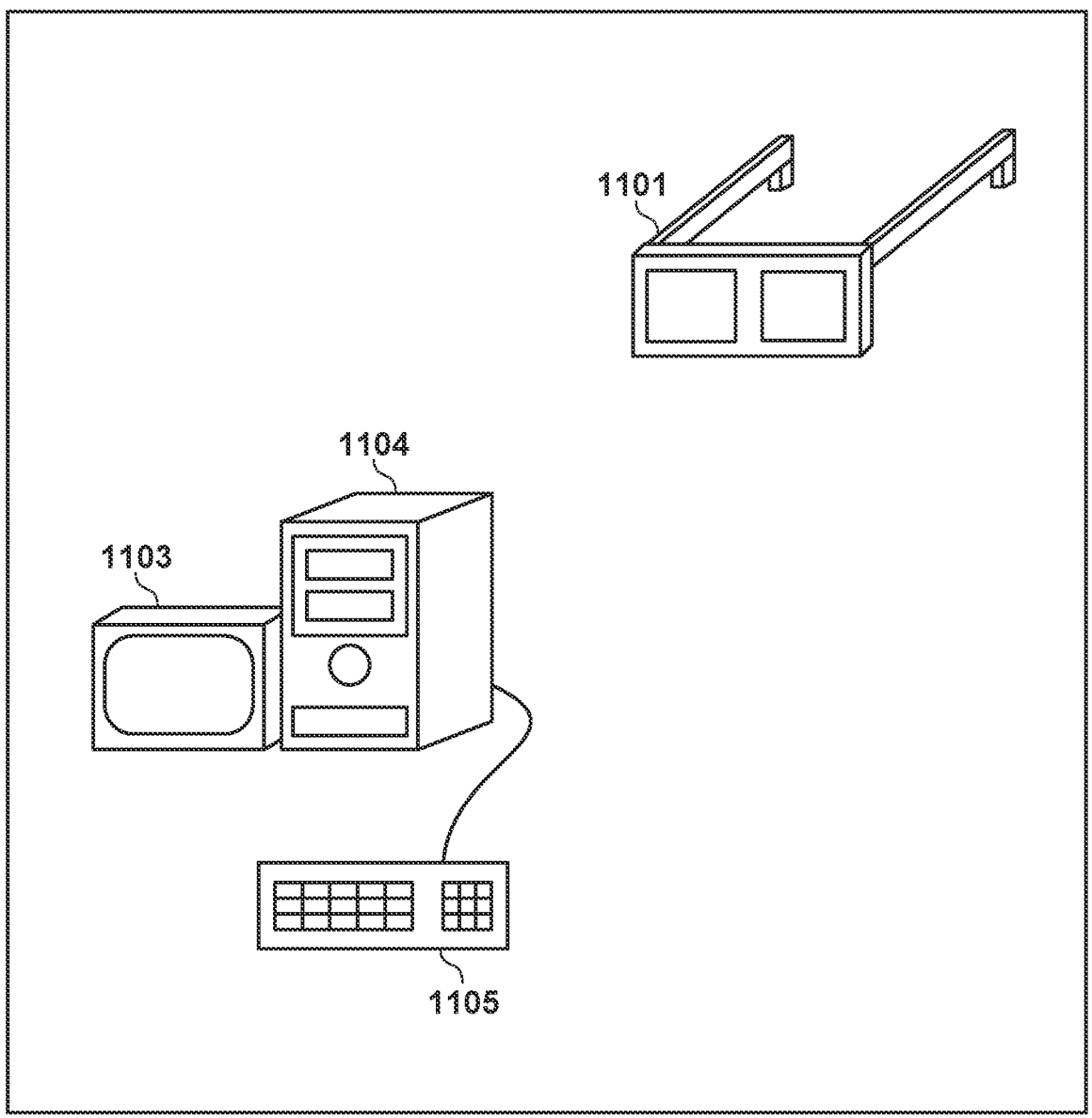
FIG. 1 is a diagram illustrating an example of the configuration of a system.

First, an example of the configuration of the system according to the present embodiment will be described with reference to FIG. 1. As illustrated in FIG. 1, the system according to the present embodiment includes an HMD 1101, a display device 1103, an image processing device 1104, and an operation device 1105. The HMD 1101 and the image processing device 1104 are configured so as to be capable of data communication with each other over a wireless or wired network. A WLAN (Wireless Local Area Network), a WPAN (Wireless Personal Area Network), or the like can be employed as a wireless network between the HMD 1101 and the image processing device 1104, for example. Note that the HMD 1101 and the image processing device 1104 may carry out data communication with each other via one or more communication devices. Additionally, the display device 1103 and the operation device 1105 are connected to the image processing device 1104.

Although the present embodiment will describe a case where the HMD 1101 is used as an example of a head-mounted display device, a head-mounted display device aside from the HMD 1101 may be used. Furthermore, the device is not limited to a head-mounted display device, and another type of display device, such as a hand-held display device, may be used instead.

An example of the functional configurations of the HMD 1101 and the image processing device 1104 will be described next with reference to the block diagram in FIG. 2.

The HMD 1101 will be described first. An image capturing unit 1202 captures a moving image of a real space and sends the images of each frame of the captured moving image (captured images of the real space) in sequence to the image processing device 1104 via a communication unit 1204. The image capturing unit 1202 is attached to the HMD 1101 so as to be located near an eye of a user wearing the HMD 1101 on his or her head (the user may be called an "HMD user" hereinafter), for example.

An attitude sensor unit 1203 is a sensor such as an accelerometer, a gyrosensor, or the like. The attitude sensor unit 1203 measures attitude information expressing its own attitude (e.g., a quaternion), its own acceleration, and its own angular velocity about each of axes (an X axis, a Y axis, and a Z axis) constituting a local coordinate system used as a reference for its own position and attitude. The attitude information, angular velocity, and acceleration measured by the attitude sensor unit 1203 may be called attitude information, an angular velocity, and an acceleration of the HMD 1101 hereinafter. Of the measured information, the attitude sensor unit 1203 sends the attitude information to the image processing device 1104 via the communication unit 1204.

Note that the items measured by the attitude sensor unit 1203 are not limited to all of its own attitude information, angular velocity, and acceleration; only one or more of these may be measured, or other information pertaining to the unit itself, such as its own position, may be measured instead of or in addition to the stated items.

A display unit 1206 is attached to the HMD 1101 so as to be located in front of an eye of the HMD user, and displays images, text, and the like output from a movement determination unit 1205.

An audio output unit 1208 is attached at a location where audio can be output to an ear of the HMD user (both ears or one ear), and outputs audio based on an audio signal output from the movement determination unit 1205.

The movement determination unit 1205 determines whether or not movement of the HMD 1101 (the head of the HMD user) based on a measurement result from the attitude sensor unit 1203 corresponds to a prescribed movement set in advance as a movement likely to induce motion sickness. If the movement of the HMD 1101 corresponds to the prescribed movement, the movement determination unit 1205 superimposes information expressing a warning on the image received from the image processing device 1104 and outputs the information to the display unit 1206 in order to notify the user of a warning. Additionally, if the movement of the HMD 1101 corresponds to the prescribed movement, the movement determination unit 1205 outputs an audio signal of audio expressing a warning to the audio output unit

1208. The movement determination unit 1205 will be described in detail later with reference to the block diagram in FIG. 3.

A control unit 1207 includes a processor such as a CPU, and memory storing computer programs executed by the processor, data, and so on. By executing processes using the computer programs, data, and so on stored in the memory, the processor controls the operations of the HMD 1101 as a whole, and executes or controls the various processes carried out by the HMD 1101, which will be described later. The communication unit 1204 functions as an interface for carrying out data communication with the image processing device 1104.

The image processing device 1104 will be described next. The image processing device 1104 is a computer device such as a PC (personal computer), a WS (workstation), a tablet terminal device, a smartphone, or the like. A communication unit 1211 functions as an interface for carrying out data communication with the HMD 1101.

A calculation unit 1212 obtains the captured image and attitude information sent from the HMD 1101 via the communication unit 1211. Then, from the obtained captured image, the calculation unit 1212 calculates a position of the image capturing unit 1202 at which the captured image was captured. Techniques for calculating, from a captured image, the position of an image capturing device at which the captured image was captured are known, and any such technique may be employed in the present embodiment. For example, a technique may be employed in which the position of an image capturing device that captured an image is calculated on the basis of a three-dimensional position, in a real space, of a feature whose position in the real space is known (an edge, corner, or the like of a real object), and image coordinates (two-dimensional coordinates) of the feature in the captured image. Additionally, the position of the image capturing device may be obtained on the basis of a value measured by a position sensor attached to the image capturing device or a head-mounted display device including the image capturing device, or the position of the image capturing device may be obtained using GPS. In other words, any technique may be employed as long as the calculation unit 1212 can obtain the position of the image capturing unit 1202 from the time when the captured image sent from the HMD 1101 was captured. Additionally, the calculation unit 1212 converts the attitude of the attitude sensor unit 1203, expressed by the obtained attitude information, using a relative attitude relationship between the image capturing unit 1202 and the attitude sensor unit 1203 (this is known information which is registered in advance in a content DB 1214). The attitude of the image capturing unit 1202 can be found through this conversion. Note that the configuration for obtaining the attitude of the image capturing unit 1202 is not limited to any specific configuration, and for example, the attitude of the image capturing unit 1202 from the time when the image was captured may be found from the captured image through the known method described above.

A CG rendering unit 1213 constructs a virtual object using virtual object data registered in the content DB 1214, and arranges the constructed virtual object in a virtual space according to a position and attitude defined by the virtual object data. The virtual object data includes model data defining the appearance of the virtual object, such as the geometrical shape, color, feel, and texture of the virtual object, data indicating the position and attitude where the virtual object is to be arranged, data pertaining to a light source illuminating the virtual space, and so on.

The CG rendering unit 1213 then generates an image of the virtual object, as seen from a point of view (the position for the point of view being the position of the image capturing unit 1202, and the attitude for the point of view being the attitude of the image capturing unit 1202), as a virtual space image. The CG rendering unit 1213 then generates, as a mixed reality space image, a composite image obtained by compositing the captured image obtained by the calculation unit 1212 from the HMD 1101 via the communication unit 1211, with the generated virtual space image. The CG rendering unit 1213 then sends the generated mixed reality space image to the HMD 1101 via the communication unit 1211.

A control unit 1219 includes a processor such as a CPU, and memory storing computer programs executed by the processor, data, and so on. By executing processes using the computer programs, data, and so on stored in the memory, the processor controls the operations of the image processing device 1104 as a whole, and executes or controls the various processes carried out by the image processing device 1104, which will be described later. A communication unit 1215 functions as an interface for connecting the operation device 1105 and the display device 1103 to the image processing device 1104.

The operation device 1105 will be described next. The operation device 1105 is constituted by a user interface such as a keyboard or the like, and can input various types of instructions by being operated by a user. The user interface is not limited to a keyboard, and may be another type of interface such as a mouse or a touch panel. Instructions input through user operations are input to the image processing device 1104 via a communication unit 1221, and the control unit 1219 then executes processes in accordance with the instructions.

The display device 1103 will be described next. The display device 1103 is constituted by a CRT screen, a liquid crystal screen, or the like, and is capable of displaying the results of processes performed by the image processing device 1104 as images, text, or the like. For example, the image processing device 1104 can display images output to the HMD 1101 in the display device 1103. Furthermore, the display device 1103 can display a GUI for editing the content of the aforementioned warning (text, audio, or the like), the content of a table (described later), and so on as well. Note that the display device 1103 may be a touch panel screen.

Although all of the aforementioned function units of the image processing device 1104 may be implemented as hardware, the calculation unit 1212 and the CG rendering unit 1213 may be implemented as software (computer programs). In the latter case, the computer programs are stored in the content DB 1214, and the functions of the calculation unit 1212 and the CG rendering unit 1213 can be realized by the control unit 1219 executing processes using those computer programs.

Figure 3:
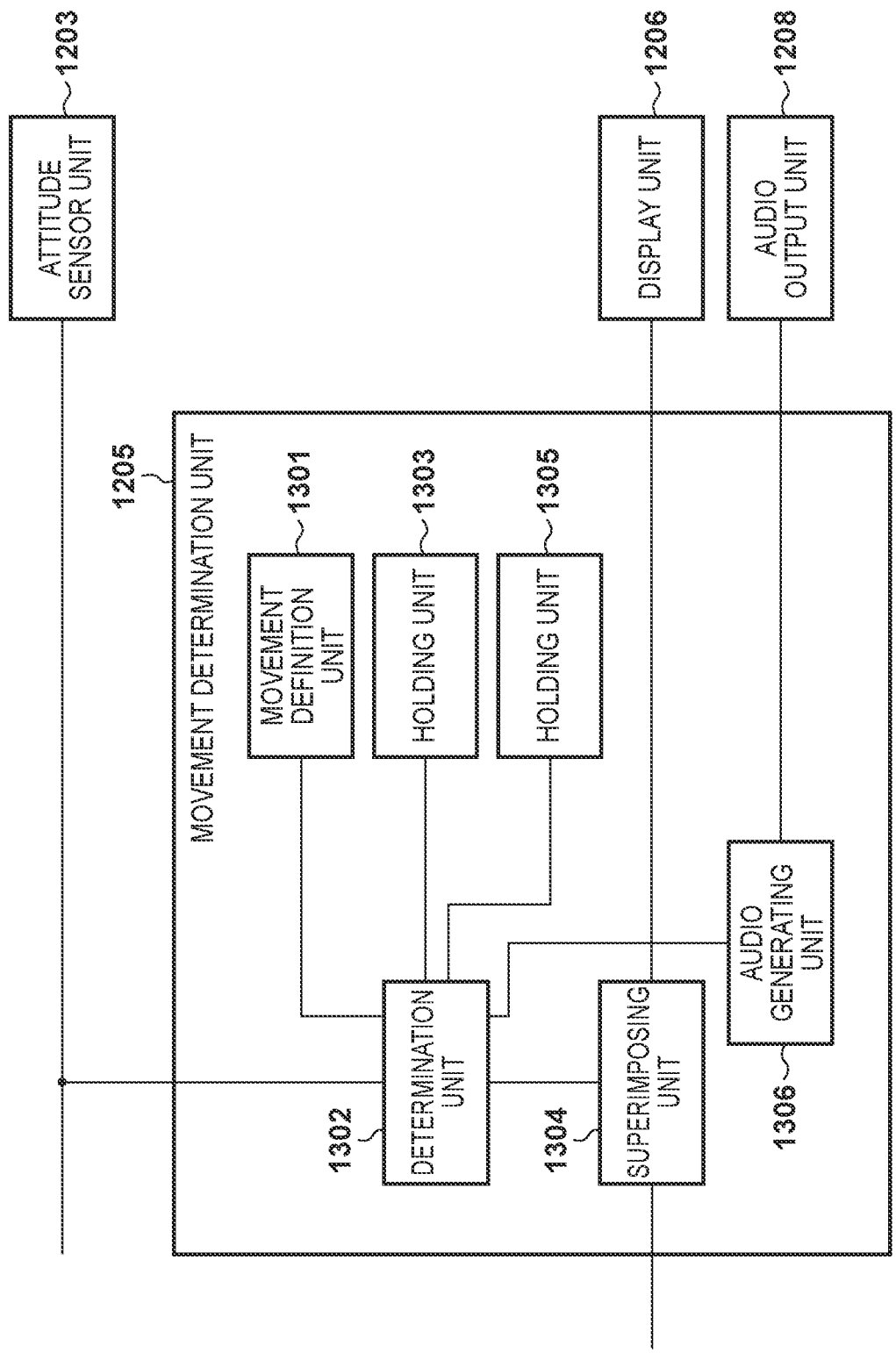
FIG. 3 is a block diagram illustrating an example of the functional configuration of a movement determination unit 1205.

An example of the functional configuration of the movement determination unit 1205 will be described next with reference to the block diagram in FIG. 3.

A movement definition unit 1301 stores a likelihood to induce motion sickness and a detection order for each of a plurality of types of movements of the user's head (the HMD 1101) which cause the user viewing the display unit 1206 while wearing the HMD 1101 on his or her head to feel sick (i.e., sickness-inducing movement). FIG. 9 illustrates an example of the configuration of the information stored in the movement definition unit 1301. In the table in FIG. 9, each of four sickness-inducing movements, namely "facing downward", "roll movement", "sudden acceleration", and "dual-axis rotation", is registered in association with a "likelihood to induce motion sickness" and a "detection order".

Figure 4A:
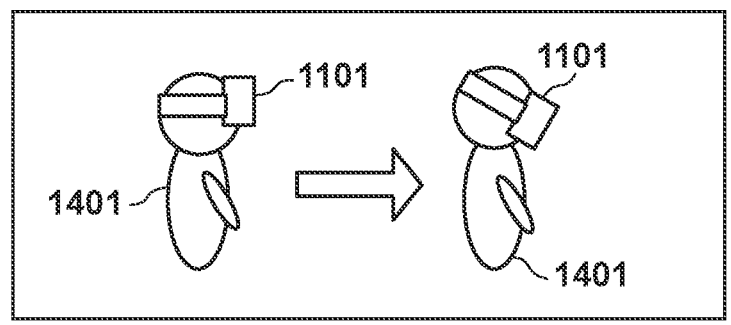
FIG. 4A is a diagram illustrating an example of a sickness-inducing movement.

FIG. 4A illustrates an example of the sickness-inducing movement "facing downward". FIG. 4A illustrates a situation where the orientation of the head of a user 1401 wearing the HMD 1101 on his or her head changes from the state illustrated on the left side of FIG. 4A (where the head is facing forward) to the state illustrated on the right side (where the head is facing forward at an inclination).

Figure 4B:
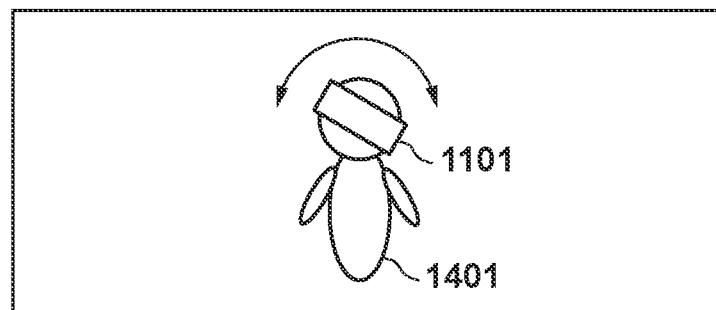
FIG. 4B is a diagram illustrating an example of a sickness-inducing movement.

FIG. 4B illustrates an example of the sickness-inducing movement "roll movement". In FIG. 4B, the head of the user 1401 wearing the HMD 1101 on his or her head is rotating in a roll direction, as indicated by the arrow.

Figure 4C:
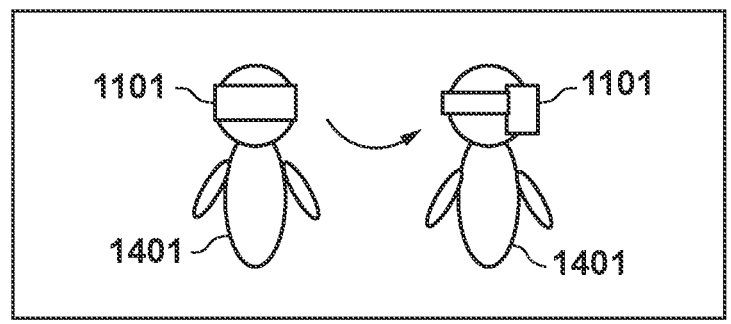
FIG. 4C is a diagram illustrating an example of a sickness-inducing movement.

FIG. 4C illustrates an example of the sickness-inducing movement "sudden acceleration". In FIG. 4C, the user 1401 wearing the HMD 1101 on his or her head is quickly turning his or her head to the left, as indicated by the arrow.

Figure 4D:
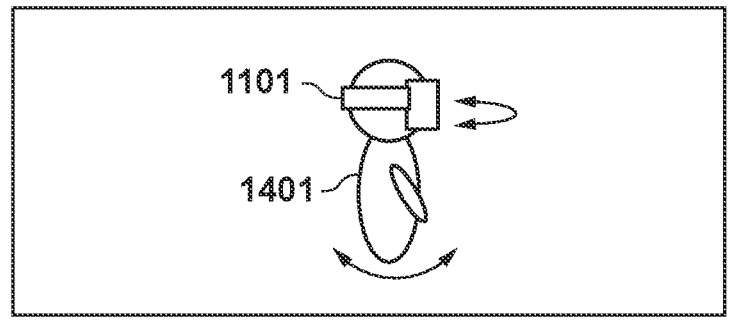
FIG. 4D is a diagram illustrating an example of a sickness-inducing movement.

FIG. 4D illustrates an example of the sickness-inducing movement "dual-axis rotation". In FIG. 4D, the head of the user 1401 wearing the HMD 1101 on his or her head is rotating about two axes (e.g., rotating in both a pan direction and a tilt direction), as indicated by the two arrows.

In the table of FIG. 9, "sickens gradually" is registered as the "likelihood to induce motion sickness" corresponding to the sickness-inducing movement "facing downward", and "sickens quickly" is registered as the "likelihood to induce motion sickness" corresponding to the sickness-inducing movement "roll movement". Furthermore, in the table of FIG. 9, "sickens gradually" is registered as the "likelihood to induce motion sickness" corresponding to the sickness-inducing movement "sudden acceleration", and "sickens quickly" is registered as the "likelihood to induce motion sickness" corresponding to the sickness-inducing movement "dual-axis rotation". "Sickens quickly" means that visually-induced motion sickness is likely to occur immediately when the stated movement is carried out. On the other hand, "sickens gradually" means that visually-induced motion sickness is likely to occur when the stated movement is continued. In this manner, information indicating the likelihood to induce motion sickness is managed for each sickness-inducing movement in the table in FIG. 9.

Additionally, in the table in FIG. 9, "4" is registered as a detection order corresponding to "facing downward", "2" is registered as a detection order corresponding to "roll movement", "3" is registered as a detection order corresponding to "sudden acceleration", and "1" is registered as a detection order corresponding to "dual-axis rotation". The detection order will be described later. Although the following will describe the movement definition unit 1301 as holding the table illustrated in FIG. 9, the sickness-inducing movements registered in the table are not limited to the sickness-inducing movements illustrated in FIG. 9, and other sickness-inducing movements may be registered instead of or in addition to the four sickness-inducing movements in FIG. 9. Furthermore, the likelihood to induce motion sickness, detection order, and so on corresponding to each sickness-inducing movement are not limited to those illustrated in FIG. 9.

A determination unit 1302 determines whether or not movement of the HMD 1101 based on a measurement result from the attitude sensor unit 1203 corresponds to a sickness-inducing movement. If the movement definition unit 1301 holds the table illustrated in FIG. 9, the determination unit 1302 first determines whether or not the movement of the HMD 1101, based on the measurement result from the attitude sensor unit 1203, corresponds to "dual-axis rotation", which is a sickness-inducing movement corresponding to the detection order of "1". If the result of this determination indicates that the movement of the HMD 1101 does not correspond to "dual-axis rotation", the determination unit 1302 determines whether or not the movement of the HMD 1101, based on the measurement result from the attitude sensor unit 1203, corresponds to "roll movement", which is a sickness-inducing movement corresponding to the detection order of "2". If the result of this determination indicates that the movement of the HMD 1101 does not correspond to "roll movement", the determination unit 1302 determines whether or not the movement of the HMD 1101, based on the measurement result from the attitude sensor unit 1203, corresponds to "sudden acceleration", which is a sickness-inducing movement corresponding to the detection order of "3". If the result of this determination indicates that the movement of the HMD 1101 does not correspond to "sudden acceleration", the determination unit 1302 determines whether or not the movement of the HMD 1101, based on the measurement result from the attitude sensor unit 1203, corresponds to "facing downward", which is a sickness-inducing movement corresponding to the detection order of "4". If the result of this determination indicates that the movement of the HMD 1101 does not correspond to "facing downward", the determination unit 1302 determines that the movement of the HMD 1101, based on the measurement result from the attitude sensor unit 1203, is "normal movement" rather than a sickness-inducing movement.

The detection order for the movements is an order based on how likely the movement is to induce sickness immediately, and in the case of FIG. 9, "dual-axis rotation" is most likely to induce sickness immediately, followed by "roll movement", "sudden acceleration", and "facing downward", in that order.

Figure 5A:
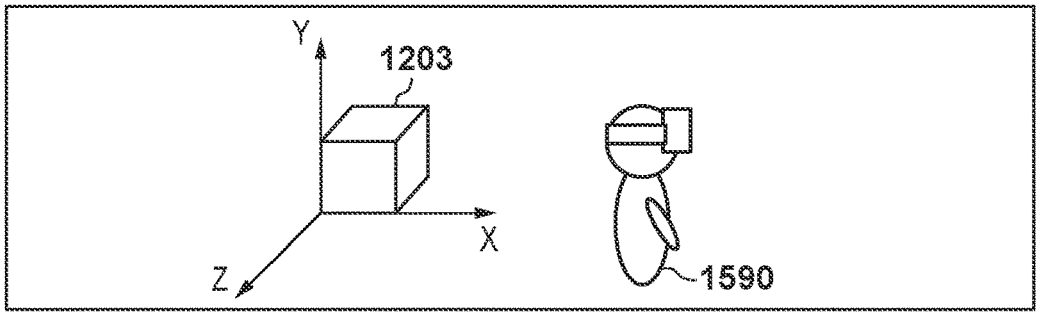
FIG. 5A is a diagram illustrating an example of movement determination.

An example of the determination unit 1302 determining whether or not movement of the HMD 1101 (the head) corresponds to a sickness-inducing movement will be described here, using the sickness-inducing movements illustrated in FIGS. 4A to 4D ("facing downward", "roll movement", "sudden acceleration", and "dual-axis rotation") as examples. As illustrated in FIG. 5A, using its own position as an origin, the attitude sensor unit 1203 measures the attitude information, angular velocity, and acceleration in a coordinate system which takes a line-of-sight direction of the image capturing unit 1202 as a positive direction on the X axis, a vertically-upward direction from the image capturing unit 1202 as a positive direction on the Y axis, and an axis orthogonal to the X axis and the Y axis as the Z axis.

Figure 5B:
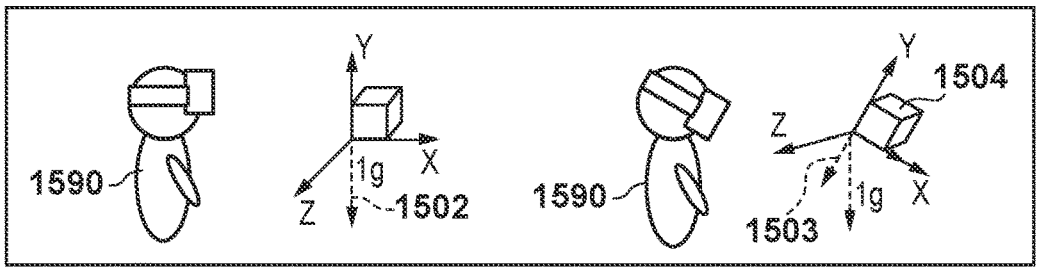
FIG. 5B is a diagram illustrating an example of movement determination.

A process through which the determination unit 1302 determines whether or not movement of the HMD 1101 (the head) is "facing downward" in a case such as this will be described first, with reference to FIG. 5B. As illustrated on the left side of FIG. 5B, when an HMD user 1590 is looking in the horizontal direction, a gravitational axis of the attitude sensor unit 1203 is oriented in a negative direction on the Y axis, as indicated by arrow 1502. However, when the HMD user 1590 is facing in the horizontal direction, a "vector indicating 1G in the negative direction on the Y axis" is output from the attitude sensor unit 1203 as the acceleration. Here, when the HMD user 1590 looks downward, the axis of the attitude sensor unit 1203 tilts as indicated on the right side of FIG. 5B, and thus the acceleration output from the attitude sensor unit 1203 is output as a Y axis direction vector 1503 and an X axis direction vector 1504. The further downward the HMD user 1590 looks, the greater the magnitude of the X axis direction vector 1504 becomes. Accordingly, the determination unit 1302 determines that the movement of the HMD 1101 (the head) is "facing downward" when the size of the X axis direction vector is greater than or equal to a prescribed size, for example.

Figure 5C:
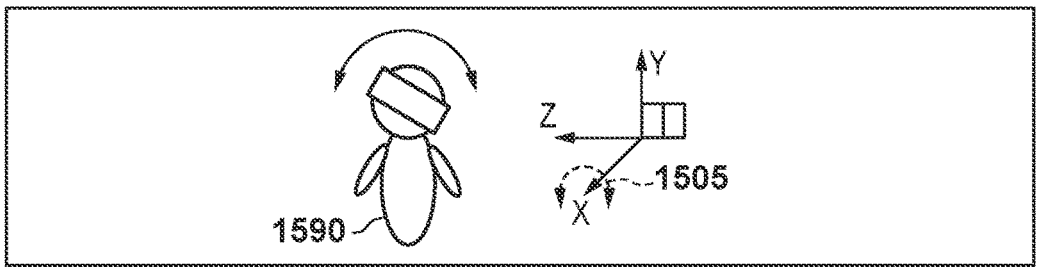
FIG. 5C is a diagram illustrating an example of movement determination.

Next, a process through which the determination unit 1302 determines whether or not movement of the HMD 1101 (the head) is "roll movement" will be described, with reference to FIG. 5C. When the HMD user 1590 rotates his or her head in the roll direction by tilting his or her neck or the like as indicated by the arrows, an angular velocity greater than or equal to a prescribed value is output from the attitude sensor unit 1203 as an angular velocity about the X axis, as indicated by arrow 1505. Accordingly, the determination unit 1302 determines that the movement of the HMD 1101 (the head) is "roll movement" if the angular velocity about the X axis is greater than or equal to the prescribed value, for example.

Figure 5D:
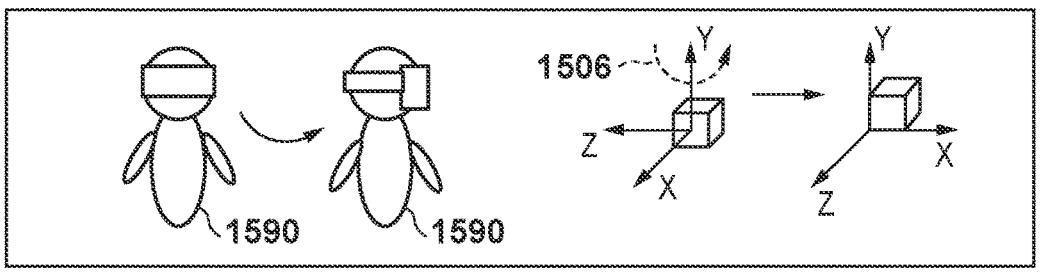
FIG. 5D is a diagram illustrating an example of movement determination.

Next, a process through which the determination unit 1302 determines whether or not movement of the HMD 1101 (the head) is "sudden acceleration" will be described, with reference to FIG. 5D. As illustrated on the left side of FIG. 5D, if the HMD user 1590 quickly turns his or her head as indicated by the arrow, an angular velocity greater than or equal to a prescribed value is output from the attitude sensor unit 1203 as an angular velocity about the Y axis indicated by arrow 1506, as illustrated on the right side of FIG. 5D. Accordingly, the determination unit 1302 determines that the movement of the HMD 1101 (the head) is "sudden acceleration" if an amount of change in the angular velocity about the Y axis is greater than or equal to the prescribed value, for example. Note that the acceleration may be used instead of the angular velocity, and the movement of the HMD 1101 (the head) may be determined to be "sudden acceleration" if an acceleration greater than or equal to a set value has been obtained.

Figure 5E:
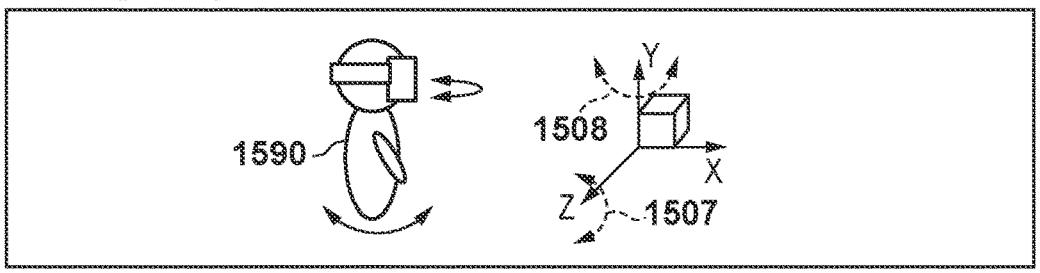
FIG. 5E is a diagram illustrating an example of movement determination.

Next, a process through which the determination unit 1302 determines whether or not movement of the HMD 1101 (the head) is "dual-axis rotation" will be described, with reference to FIG. 5E. Assume that, as illustrated in FIG. 5E, the HMD user 1590 has rotated his or her head in the pan direction and the tilt direction, as indicated by the two arrows. At this time, from the attitude sensor unit 1203, an angular velocity greater than or equal to a prescribed value is output as an angular velocity about the Y axis, indicated by arrow 1508, and an angular velocity greater than or equal to a prescribed value is output as an angular velocity about the Z axis, indicated by arrow 1507. Accordingly, for example, the determination unit 1302 determines that the movement of the HMD 1101 (the head) is "dual-axis rotation" if an angular velocity greater than or equal to the prescribed value is output as the angular velocity about the Y axis, and an angular velocity greater than or equal to the prescribed value is output as the angular velocity about the Z axis, from the attitude sensor unit 1203.

In this manner, the determination unit 1302 can determine which sickness-inducing movement the movement of the HMD 1101 (the head) is on the basis of the measurement results output from the attitude sensor unit 1203. Note that the processing for determining what type of movement the measurement results from the attitude sensor unit 1203 indicate is not limited to any specific type of processing.

Then, when the determination unit 1302 has determined that the movement of the HMD 1101 (the head) corresponds to a sickness-inducing movement, text information corresponding to the likelihood to induce motion sickness corresponding to that sickness-inducing movement is obtained from text information stored in a holding unit 1303. The text information is a character or a character string expressing a warning (a warning message). The present embodiment assumes that text information corresponding to each likelihood to induce motion sickness is held in the holding unit 1303. For example, if there are two types of the likelihood to induce motion sickness, namely "sickens gradually" and "sickens quickly", text information corresponding to "sickens gradually" and text information corresponding to "sickens quickly" are stored in the holding unit 1303. However, for example, when the determination unit 1302 has determined that the movement of the HMD 1101 (the head) is "facing downward", the corresponding likelihood to induce motion sickness in the table of FIG. 9 is "sickens gradually", and thus the text information associated with the likelihood to induce motion sickness of "sickens gradually" is obtained from the holding unit 1303. Additionally, for example, when the determination unit 1302 has determined that the movement of the HMD 1101 (the head) is "roll movement", the corresponding likelihood to induce motion sickness in the table of FIG. 9 is "sickens quickly", and thus the text information associated with the likelihood to induce motion sickness of "sickens quickly" is obtained from the holding unit 1303. Note that the holding unit 1303 may hold text information corresponding to each sickness-inducing movement, in addition to or instead of holding text information corresponding to each likelihood to induce motion sickness. In this case, the determination unit 1302 obtains, from the holding unit 1303, the text information corresponding to the movement of the HMD 1101 (the head) and/or the text information corresponding to the likelihood to induce motion sickness corresponding to the movement of the HMD 1101 (the head). After obtaining the text information from the holding unit 1303, the determination unit 1302 sends the obtained text information to a superimposing unit 1304.

Additionally, when the determination unit 1302 has determined that the movement of the HMD 1101 (the head) corresponds to a sickness-inducing movement, audio data corresponding to the likelihood to induce motion sickness corresponding to that sickness-inducing movement is obtained from audio data stored in a holding unit 1305. The present embodiment assumes that audio data corresponding to each likelihood to induce motion sickness is held in the holding unit 1305. For example, if there are two types of the likelihood to induce motion sickness, namely "sickens gradually" and "sickens quickly", audio data corresponding to "sickens gradually" and audio data corresponding to "sickens quickly" are stored in the holding unit 1305. However, for example, when the determination unit 1302 has determined that the movement of the HMD 1101 (the head) is "facing downward", the corresponding likelihood to induce motion sickness in the table of FIG. 9 is "sickens gradually", and thus the audio data associated with the likelihood to induce motion sickness of "sickens gradually" is obtained from the holding unit 1305. Additionally, for example, when the determination unit 1302 has determined that the movement of the HMD 1101 (the head) is "roll movement", the corresponding likelihood to induce motion sickness in the table of FIG. 9 is "sickens quickly", and thus the audio data associated with the likelihood to induce motion sickness of "sickens quickly" is obtained from the holding unit 1305. Note that the holding unit 1305 may hold audio data corresponding to each sickness-inducing movement, in addition to or instead of holding audio data corresponding to each likelihood to induce motion sickness. In this case, the determination unit 1302 obtains, from the holding unit 1305, the audio data corresponding to the movement of the HMD 1101 (the head) and/or the audio data corresponding to the likelihood to induce motion sickness corresponding to the movement of the HMD 1101 (the head). After obtaining the audio data from the holding unit 1305, the determination unit 1302 sends the obtained audio data to an audio generating unit 1306.

When the text information has been obtained from the determination unit 1302, the superimposing unit 1304 superimposes a message expressing that text information on the mixed reality space image received from the image processing device 1104 via the communication unit 1204, and sends the mixed reality space image superimposed with that message to the display unit 1206. On the other hand, when the text information has not been obtained from the determination unit 1302, the superimposing unit 1304 sends the mixed reality space image received from the image processing device 1104 via the communication unit 1204 to the display unit 1206.

Figure 6A:
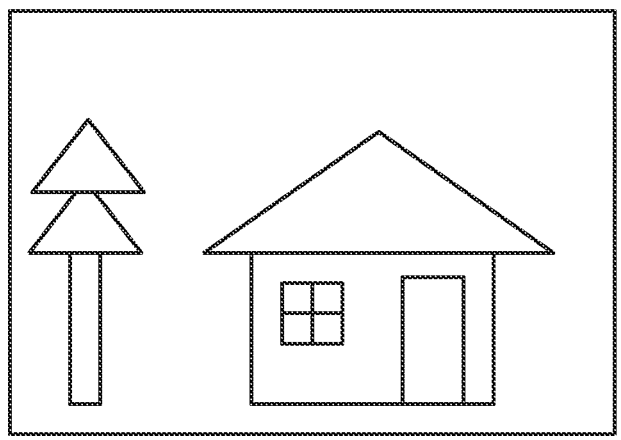
FIG. 6A is a diagram illustrating an example of a mixed reality space image.
Figure 6B:
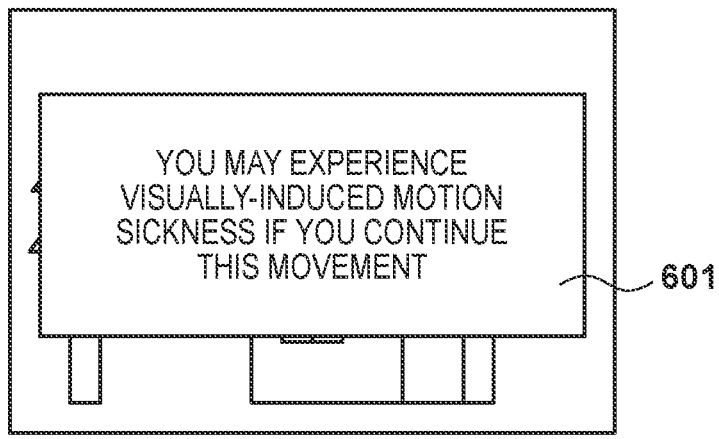
FIG. 6B is a diagram illustrating an example of a mixed reality space image on which a warning message has been superimposed.
Figure 6C:
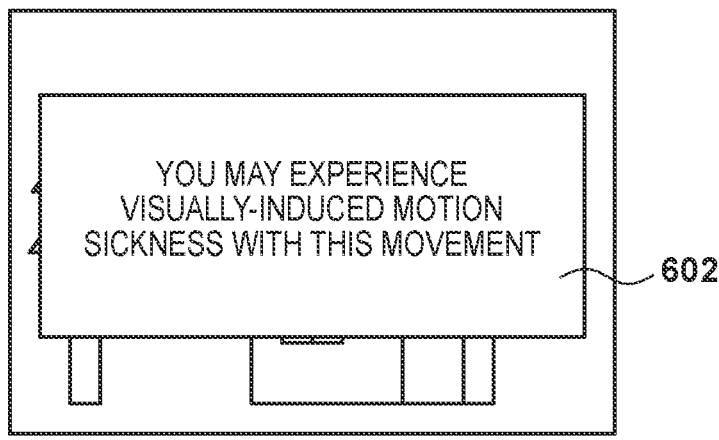
FIG. 6C is a diagram illustrating an example of a mixed reality space image on which a warning message has been superimposed.

Assume, for example, that the superimposing unit 1304 has received the mixed reality space image illustrated in FIG. 6A from the image processing device 1104. At this time, when the current movement of the HMD 1101 is normal movement rather than a sickness-inducing movement, the superimposing unit 1304 sends the mixed reality space image illustrated in FIG. 6A, received from the image processing device 1104, to the display unit 1206 without superimposing the warning message. Assume now that the current movement of the HMD 1101 is a sickness-inducing movement and the likelihood to induce motion sickness of the sickness-inducing movement is "sickens gradually". At this time, as illustrated in FIG. 6B, the superimposing unit 1304 superimposes a warning message 601, for notifying the HMD user that he or she may experience visually-induced motion sickness if he or she continues the current movement (head movement), on the mixed reality space image illustrated in FIG. 6A, received from the image processing device 1104. The superimposing unit 1304 then sends the mixed reality space image, on which the warning message 601 is superimposed, to the display unit 1206. Assume now that the current movement of the HMD 1101 is a sickness-inducing movement and the likelihood to induce motion sickness of the sickness-inducing movement is "sickens quickly". At this time, as illustrated in FIG. 6C, the superimposing unit 1304 superimposes a warning message 602, for notifying the HMD user that he or she may experience visually-induced motion sickness with the current movement (head movement), on the mixed reality space image illustrated in FIG. 6A, received from the image processing device 1104. The superimposing unit 1304 then sends the mixed reality space image, on which the warning message 602 is superimposed, to the display unit 1206. Note that the content of the warning message, the display method, and the like are not limited to any specific content, display method, or the like.

When the audio data has been obtained from the determination unit 1302, the audio generating unit 1306 generates an audio signal based on that audio data and sends the audio signal to the audio output unit 1208. Through this, when the current movement of the HMD 1101 is a sickness-inducing movement, audio expressing a warning based on the likelihood to induce motion sickness is output from the audio output unit 1208. In other words, if the likelihood to induce motion sickness is "sickens gradually", audio for notifying the HMD user that he or she may experience visually-induced motion sickness if he or she continues the current movement (head movement) is output from the audio output unit 1208. On the other hand, if the likelihood to induce motion sickness is "sickens quickly", audio for notifying the HMD user that he or she may experience visually-induced motion sickness with the current movement (head movement) is output from the audio output unit 1208. However, when the current movement of the HMD 1101 is normal movement rather than a sickness-inducing movement, the determination unit 1302 does not send the audio data to the audio generating unit 1306, and thus no audio is output from the audio output unit 1208.

The warning may be notified to the HMD user only as the above-described display made by the display unit 1206, only as the above-described audio output by the audio output unit 1208, or as both the above-described display and audio output.

A process through which the HMD 1101 displays one frame's worth of the mixed reality space image in the display unit 1206 will be described next with reference to FIG. 7, which is a flowchart indicating that process. By repeating the process according to the flowchart in FIG. 7, the HMD 1101 can display a plurality of frames' worth of the mixed reality space image in the display unit 1206.

In step S1701, the image capturing unit 1202 obtains a captured image of a real space by capturing an image of the real space, and sends the obtained captured image to the image processing device 1104 via the communication unit 1204. In step S1702, the attitude sensor unit 1203 measures and obtains its own attitude information, acceleration, and angular velocity, and sends the obtained attitude information to the image processing device 1104 via the communication unit 1204.

Figure 8:
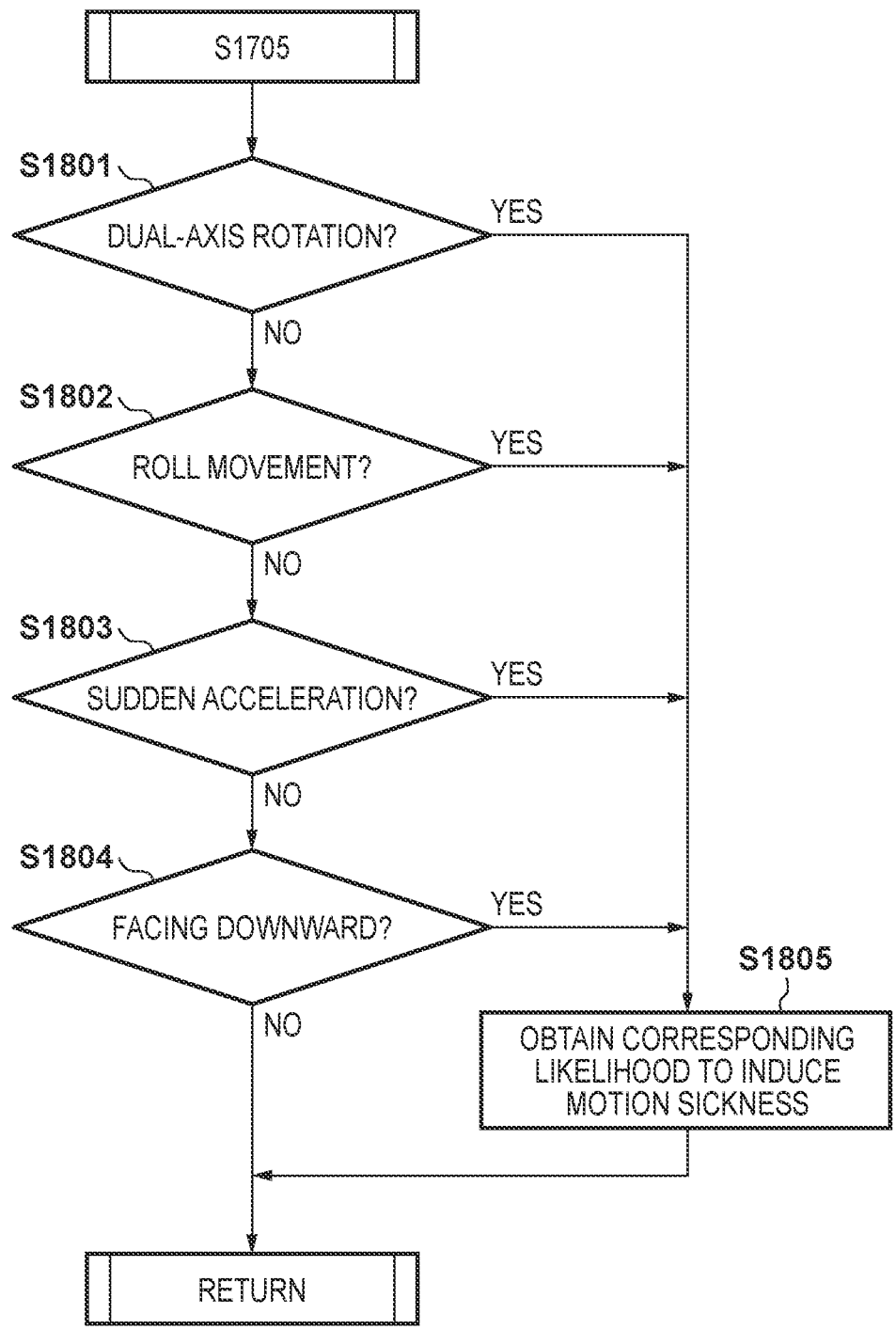
FIG. 8 is a flowchart illustrating details of the process of step S1705.

In step S1703, the superimposing unit 1304 receives the mixed reality space image sent from the image processing device 1104 via the communication unit 1204. In step S1705, the determination unit 1302 determines whether the movement of the HMD 1101 (the head of the HMD user), based on the measurement result (the attitude information, angular velocity, and acceleration) obtained by the attitude sensor unit 1203 in step S1702, is normal movement or one of the sickness-inducing movements. The process carried out in step S1705 will be described in detail with reference to the flowchart in FIG. 8.

In step S1801, the determination unit 1302 determines whether or not some or all of the measurement results obtained by the attitude sensor unit 1203 satisfy a condition corresponding to the sickness-inducing movement of "dual-axis rotation", which has a detection order of "1" in the table held by the movement definition unit 1301 and illustrated in FIG. 9. An example of this determination process has already been described with reference to FIG. 5E.

Assume that it has been determined that some or all of the measurement results obtained by the attitude sensor unit 1203 satisfy the condition corresponding to the sickness-inducing movement of "dual-axis rotation" (i.e., the movement indicated by the measurement results from the attitude sensor unit 1203 corresponds to "dual-axis rotation"). At this time, the determination unit 1302 determines that the movement of the HMD 1101 (the head), based on the measurement results from the attitude sensor unit 1203, is "dual-axis rotation", and the process moves to step S1805. However, if it has been determined that some or all of the measurement results obtained by the attitude sensor unit 1203 do not satisfy the condition corresponding to the sickness-inducing movement of "dual-axis rotation" (i.e., the movement indicated by the measurement results from the attitude sensor unit 1203 does not correspond to "dual-axis rotation"), the process moves to step S1802.

In step S1802, the determination unit 1302 determines whether or not some or all of the measurement results obtained by the attitude sensor unit 1203 satisfy a condition corresponding to the sickness-inducing movement of "roll movement", which has a detection order of "2" in the table held by the movement definition unit 1301 and illustrated in FIG. 9. An example of this determination process has already been described with reference to FIG. 5C.

Assume that it has been determined that some or all of the measurement results obtained by the attitude sensor unit 1203 satisfy the condition corresponding to the sickness-inducing movement of "roll movement" (i.e., the movement indicated by the measurement results from the attitude sensor unit 1203 corresponds to "roll movement"). At this time, the determination unit 1302 determines that the movement of the HMD 1101 (the head), based on the measurement results from the attitude sensor unit 1203, is "roll movement", and the process moves to step S1805. However, if it has been determined that some or all of the measurement results obtained by the attitude sensor unit 1203 do not satisfy the condition corresponding to the sickness-inducing movement of "roll movement" (i.e., the movement indicated by the measurement results from the attitude sensor unit 1203 does not correspond to "roll movement"), the process moves to step S1803.

In step S1803, the determination unit 1302 determines whether or not some or all of the measurement results obtained by the attitude sensor unit 1203 satisfy a condition corresponding to the sickness-inducing movement of "sudden acceleration", which has a detection order of "3" in the table held by the movement definition unit 1301 and illustrated in FIG. 9. An example of this determination process has already been described with reference to FIG. 5D.

Assume that it has been determined that some or all of the measurement results obtained by the attitude sensor unit 1203 satisfy the condition corresponding to the sickness-inducing movement of "sudden acceleration" (i.e., the movement indicated by the measurement results from the attitude sensor unit 1203 corresponds to "sudden acceleration"). At this time, the determination unit 1302 determines that the movement of the HMD 1101 (the head), based on the measurement results from the attitude sensor unit 1203, is "sudden acceleration", and the process moves to step S1805. However, if it has been determined that some or all of the measurement results obtained by the attitude sensor unit 1203 do not satisfy the condition corresponding to the sickness-inducing movement of "sudden acceleration" (i.e., the movement indicated by the measurement results from the attitude sensor unit 1203 does not correspond to "sudden acceleration"), the process moves to step S1804.

In step S1804, the determination unit 1302 determines whether or not some or all of the measurement results obtained by the attitude sensor unit 1203 satisfy a condition corresponding to the sickness-inducing movement of "facing downward", which has a detection order of "4" in the table held by the movement definition unit 1301 and illustrated in FIG. 9. An example of this determination process has already been described with reference to FIG. 5B.

Assume that it has been determined that some or all of the measurement results obtained by the attitude sensor unit 1203 satisfy the condition corresponding to the sickness-inducing movement of "facing downward" (i.e., the movement indicated by the measurement results from the attitude sensor unit 1203 corresponds to "facing downward"). At this time, the determination unit 1302 determines that the movement of the HMD 1101 (the head), based on the measurement results from the attitude sensor unit 1203, is "facing downward", and the process moves to step S1805. Now assume that it has been determined that some or all of the measurement results obtained by the attitude sensor unit 1203 do not satisfy the condition corresponding to the sickness-inducing movement of "facing downward" (i.e., the movement indicated by the measurement results from the attitude sensor unit 1203 does not correspond to "facing downward"). At this time, the determination unit 1302 determines that the movement of the HMD 1101 (the head), based on the measurement results from the attitude sensor unit 1203, is normal movement, and the process moves to step S1706.

In step S1805, the determination unit 1302 obtains, from the table held in the movement definition unit 1301 and illustrated in FIG. 9, the likelihood to induce motion sickness corresponding to the sickness-inducing movement corresponding to the movement of the HMD 1101 (the head) based on the measurement results from the attitude sensor unit 1203. The process then moves to step S1706.

Returning to FIG. 7, next, in step S1706, the determination unit 1302 determines whether or not the movement of the HMD 1101 (the head) is normal movement, as a result of the process carried out in step S1705. If it is determined that the movement of the HMD 1101 (the head) is normal movement, the process moves to step S1707. However, if the movement of the HMD 1101 (the head) is not normal movement (i.e., is one of the sickness-inducing movements), the process moves to step S1708.

In step S1707, the superimposing unit 1304 sends the mixed reality space image, received from the image processing device 1104 in the aforementioned step S1703, to the display unit 1206, and causes the mixed reality space image to be displayed in the display unit 1206.

In step S1708, the determination unit 1302 determines whether or not the likelihood to induce motion sickness obtained in the aforementioned step S1805 is "sickens quickly". If it is determined that the likelihood to induce motion sickness obtained in the aforementioned step S1805 is "sickens quickly", the process moves to step S1709. However, if it is determined that the likelihood to induce motion sickness obtained in the aforementioned step S1805 is "sickens gradually", the process moves to step S1710.

In step S1709, the determination unit 1302 obtains the text information corresponding to "sickens quickly" from the holding unit 1303, and then sends the obtained text information to the superimposing unit 1304. The superimposing unit 1304 then superimposes the warning message indicated by the text information received from the determination unit 1302 on the mixed reality space image received from the image processing device 1104 in the aforementioned step S1703, and sends the mixed reality space image superimposed with the warning message to the display unit 1206.

In step S1710, the determination unit 1302 obtains the text information corresponding to "sickens gradually" from the holding unit 1303, and then sends the obtained text information to the superimposing unit 1304. The superimposing unit 1304 then superimposes the warning message indicated by the text information received from the determination unit 1302 on the mixed reality space image received from the image processing device 1104 in the aforementioned step S1703, and sends the mixed reality space image superimposed with the warning message to the display unit 1206.

Figure 7:
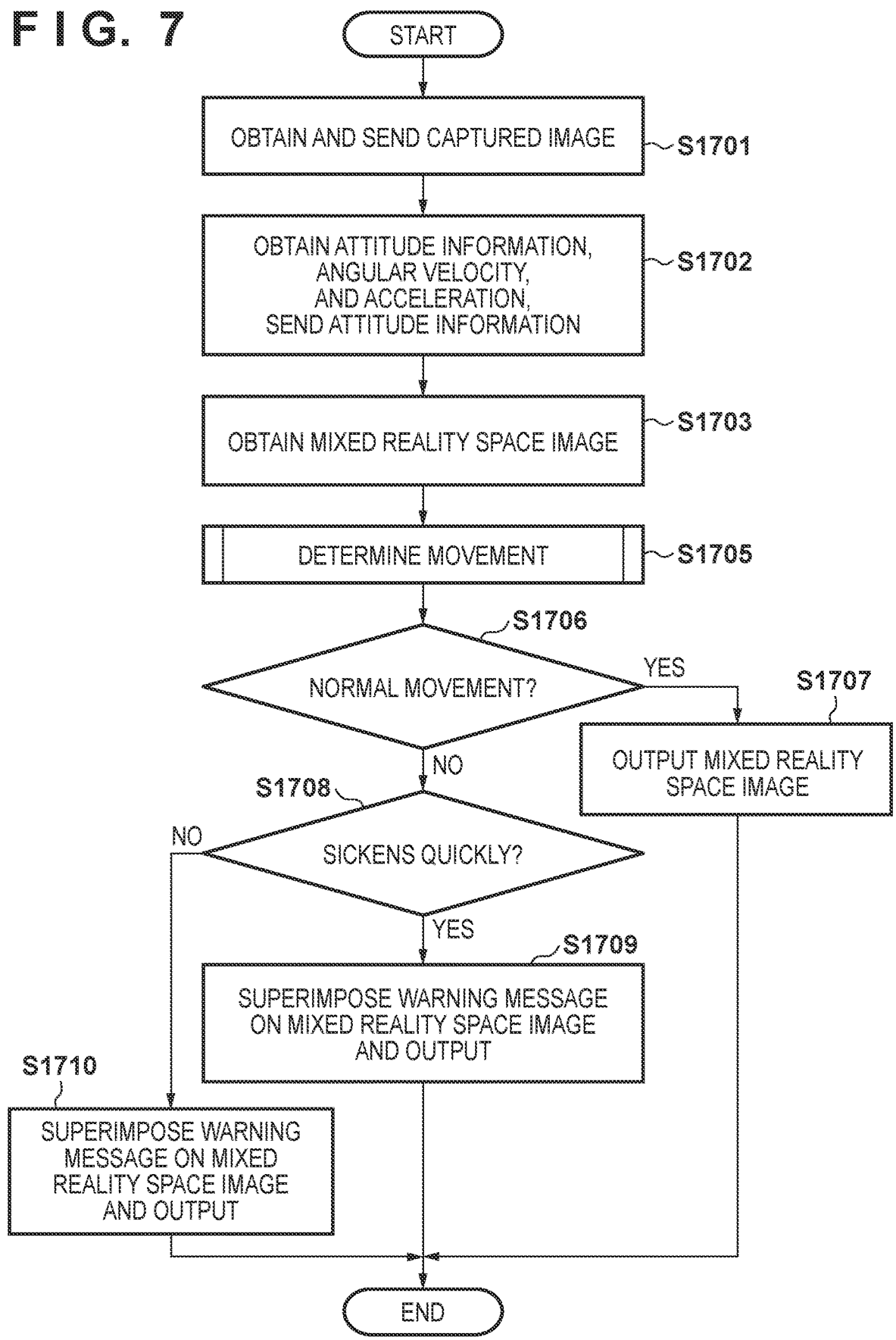
FIG. 7 is a flowchart illustrating processing carried out by the HMD 1101.

Note that the flowchart in FIG. 7 only indicates a display notification being made as the warning notified when the movement of the HMD 1101 (the head) based on the measurement results from the attitude sensor unit 1203 is a sickness-inducing movement. However, a corresponding audio notification may furthermore be carried out in steps S1709 and S1710. In other words, an audio notification based on audio data corresponding to "sickens quickly" may be carried out in addition to or instead of the display notification in step S1709, and an audio notification based on audio data corresponding to "sickens gradually" may be carried out in addition to or instead of the display notification in step S1710.

Thus according to the present embodiment, by providing a warning to the HMD user when he or she moves his or her head in a manner likely to induce sickness, the HMD user can be prompted to take caution and be aware of the situation.

Variations on First Embodiment

The first embodiment described the function units of the HMD 1101 as all being implemented by hardware. However, some of the functions of the movement determination unit 1205 (e.g., the determination unit 1302, the superimposing unit 1304, and audio generating unit 1306 illustrated in FIG. 3) may be implemented by software (computer programs). In this case, the computer programs are stored in memory included in the control unit 1207. The functions of the determination unit 1302, the superimposing unit 1304, and the audio generating unit 1306 can then be realized by the processor of the control unit 1207 executing the computer programs.

In the first embodiment, the attitude information, acceleration, and angular velocity are measured using a sensor such as an accelerometer, a gyrosensor, or the like, but the movement of the HMD 1101 (the head) may be obtained using another method instead. For example, the position, attitude, or the like of the HMD 1101 may be measured using a magnetism sensor, an optical sensor, or an ultrasonic sensor, and the HMD 1101 or the image processing device 1104 may then find the acceleration, angular velocity, and the like from changes in the measured position, attitude, and so on. Alternatively, an image capturing device that captures an image of the HMD user may be installed in the real space, and the HMD 1101 or the image processing device 1104 may find the attitude information, acceleration, and angular velocity of the head of the HMD user from the captured image obtained by the image capturing device.

Additionally, in the first embodiment, the warning is notified through a display and/or audio, but the warning may be notified through a different notification method. For example, a vibrator may be installed in the HMD 1101, and the warning, the likelihood to induce motion sickness, and so on may be notified the HMD user using a vibration pattern based on the likelihood to induce motion sickness corresponding to the current movement of the HMD 1101 (the head). Alternatively, the warning, the likelihood to induce motion sickness, and so on may be notified through a lighting or a flashing pattern of a lamp. In this case, the warning, the likelihood to induce motion sickness, and so on may be notified by the image processing device 1104 controlling the lighting or the flashing pattern of the lamp in accordance with the likelihood to induce motion sickness corresponding to the current movement of the HMD 1101 (the head), for example.

Additionally, although the first embodiment described the HMD 1101 as being a video see-through-type HMD, an optical see-through-type HMD may be employed instead. In this case, it is necessary to find the position of the point of view using one of the various aforementioned known techniques, such as by using a sensor. Additionally, the image processing device 1104 sends the generated virtual space image to the HMD 1101. Then, when the text information has been obtained from the determination unit 1302, the superimposing unit 1304 superimposes a warning message based on that text information on the virtual space image received from the image processing device 1104, and the virtual space image on which the warning message is superimposed is then displayed in the display unit 1206. On the other hand, when the text information has not been obtained from the determination unit 1302, the superimposing unit 1304 displays the virtual space image received from the image processing device 1104 in the display unit 1206.

Additionally, in the first embodiment, a warning image may be superimposed on the mixed reality space image instead of or in addition to the warning message. The warning image is an image related to the warning, such as a mark expressing a warning, a character image, or the like, for example. The warning image may be a two-dimensional image created in advance, or may be a CG image of a three-dimensional virtual object generated by the superimposing unit 1304 on the basis of the position and attitude of the point of view.

Additionally, although the acceleration is measured by the attitude sensor unit 1203 in the first embodiment, the method for obtaining the acceleration is not limited to a specific obtainment method. For example, if the position of the image capturing unit 1202 has been obtained, the HMD 1101 or the image processing device 1104 may find the acceleration on the basis of changes in the stated position.

Additionally, in the first embodiment, the content of the warning is intended to notify that the HMD user may experience visually-induced motion sickness if he or she continues the current movement (head movement), that the HMD user may experience visually-induced motion sickness with the current movement (head movement), and so on. However, the content of the warning may be any content as long as it is related to the warning. Additionally, the content that is notified is not limited to a warning, and may simply be a message for notifying the HMD user of his or her current head movement, for example.

Additionally, the calculation unit 1212 may be moved to the HMD 1101. In this case, the calculation unit 1212 finds the position and attitude of the image capturing unit 1202, and sends the position and attitude to the image processing device 1104. The CG rendering unit 1213 then generates the virtual space image on the basis of the position and attitude, and sends the virtual space image to the HMD 1101. The superimposing unit 1304 generates, as the mixed reality space image, a composite image obtained by compositing the captured image from the image capturing unit 1202 with the virtual space image received from the image processing device 1104. In this manner, the way in which the process for generating the mixed reality space image is divided between the image processing device 1104 and the HMD 1101 is not limited to any specific configuration.

Second Embodiment

The following embodiments and variations, including the present embodiment, will focus on the differences from the first embodiment, and items not mentioned explicitly in the following are assumed to be the same as in the first embodiment. First, an example of the functional configurations of the HMD 1101 and the image processing device 1104 will be described next with reference to the block diagram in FIG. 10.

Figure 2:
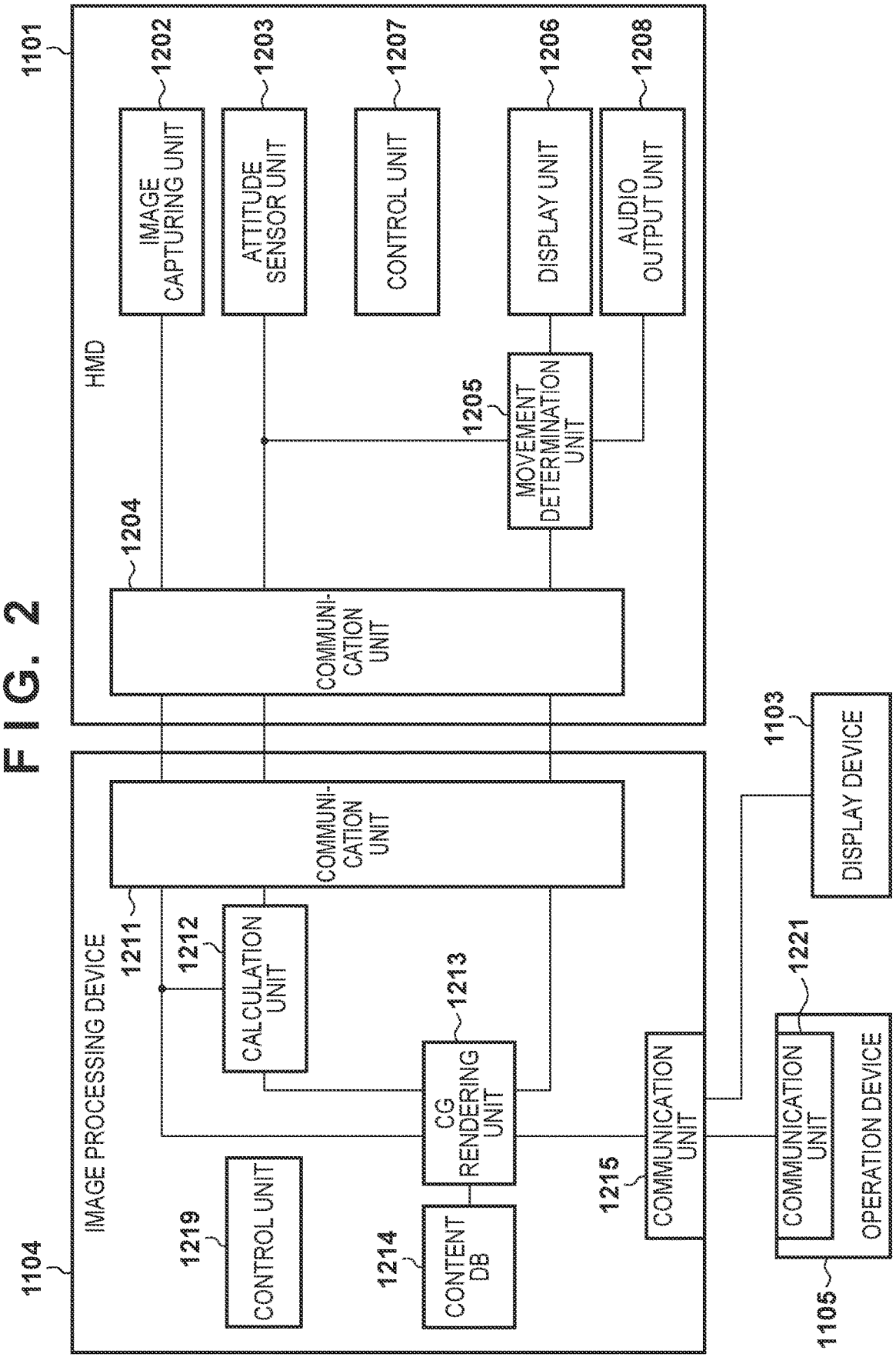
FIG. 2 is a block diagram illustrating an example of the functional configurations of an HMD 1101 and an image processing device 1104.
Figure 10:
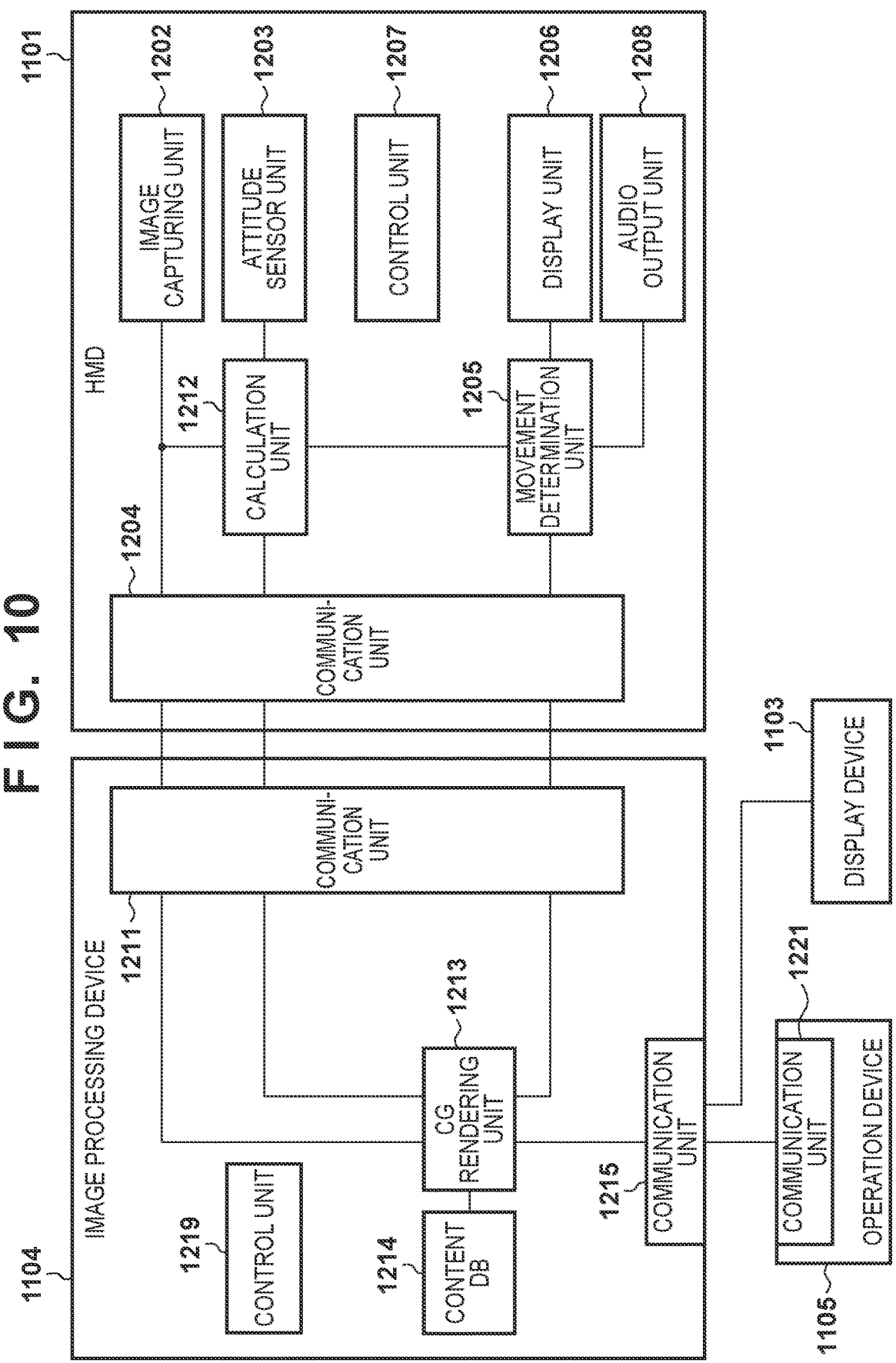
FIG. 10 is a block diagram illustrating an example of the functional configurations of the HMD 1101 and the image processing device 1104.

The configuration illustrated in FIG. 10 is obtained by moving the calculation unit 1212, which is included in the image processing device 1104 in the configuration illustrated in FIG. 2, to the HMD 1101. Then, from the image captured by the image capturing unit 1202, the calculation unit 1212 calculates the position of the image capturing unit 1202 at which the captured image was captured. Additionally, the calculation unit 1212 converts the attitude measured by the attitude sensor unit 1203, using a relative attitude relationship between the image capturing unit 1202 and the attitude sensor unit 1203 (this is known information which is registered in advance in memory (not shown) included in the HMD 1101). The attitude of the image capturing unit 1202 can be found through this conversion. Then, the calculation unit 1212 sends the position and attitude of the image capturing unit 1202 to the image processing device 1104 via the communication unit 1204.

The CG rendering unit 1213 then generates an image of a virtual object, as seen from a point of view (the position and attitude for the point of view being the position and attitude, respectively, of the image capturing unit 1202 received from the HMD 1101 via the communication unit 1211), as a virtual space image. The CG rendering unit 1213 then generates, as a mixed reality space image, a composite image obtained by compositing the captured image received from the HMD 1101 via the communication unit 1211, with the generated virtual space image, and sends the generated mixed reality space image to the HMD 1101 via the communication unit 1211.

Figure 11:
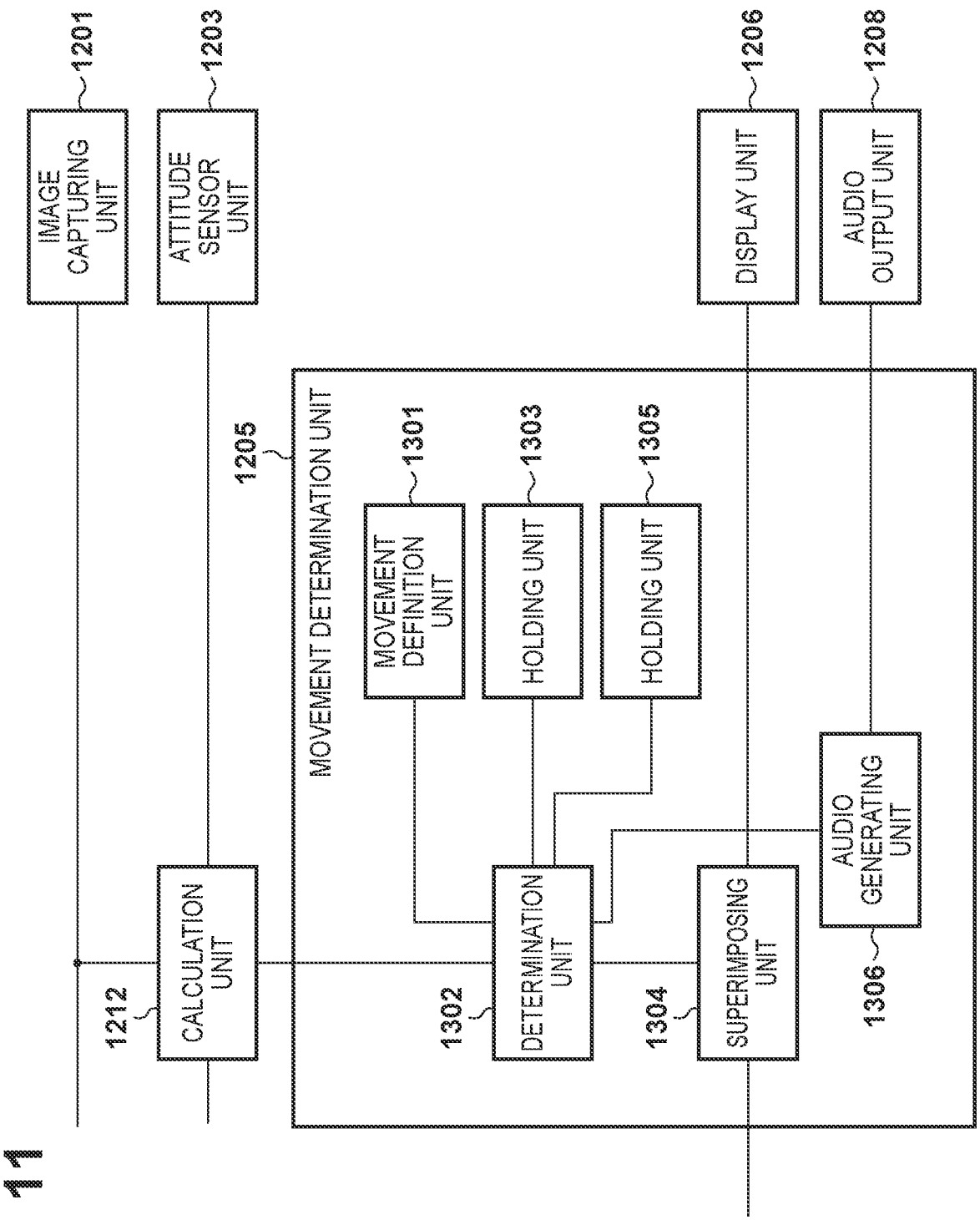
FIG. 11 is a block diagram illustrating an example of the functional configuration of the movement determination unit 1205.

The movement determination unit 1205 determines whether or not movement of the head of the HMD user based on the position and attitude of the image capturing unit 1202 calculated by the calculation unit 1212, the acceleration and angular velocity measured by the attitude sensor unit 1203, and so on corresponds to a prescribed movement set in advance as a movement likely to induce motion sickness. An example of the functional configuration of the movement determination unit 1205 according to the present embodiment will be described with reference to the block diagram in FIG. 11.

The calculation unit 1212 sends the position and attitude of the image capturing unit 1202, found as described above, and the acceleration and angular velocity measured by the attitude sensor unit 1203, to the determination unit 1302. The determination unit 1302 has also obtained the position of the image capturing unit 1202, and can therefore determine movement based on the position of the image capturing unit 1202 in addition to determining the movement as described in the first embodiment; for example, walking movement can also be detected, as illustrated in FIG. 12.

Figures 12, 13:
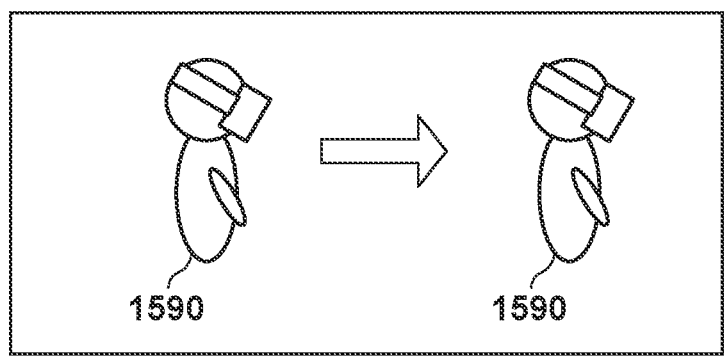
FIG. 12 is a diagram illustrating an example of movement determination.
FIG. 13 is a diagram illustrating an example of the configuration of a table held in the movement definition unit 1301.

In FIG. 12, the HMD user 1590 is walking in the direction indicated by the arrow while facing downward. Whether or not the HMD user is moving in this manner can be determined as follows, for example. A method for determining that the HMD user 1590 is facing downward has already been described with reference to FIG. 5B. To determine whether the HMD user 1590 is walking, the HMD user 1590 can be determined to be walking if, for example, a change in his or her position per unit of time is greater than or equal to a prescribed amount.

FIG. 13 is a diagram illustrating an example of the configuration of a table held in the movement definition unit 1301. The table illustrated in FIG. 13 adds "walking while facing downward" as a new sickness-inducing movement to the table illustrated in FIG. 9, as well as "sickens gradually" as the corresponding likelihood to induce motion sickness. Additionally, the detection order for each sickness-inducing movement has been changed from that illustrated in FIG. 9. Although the table held by the movement definition unit 1301 has been changed from the table illustrated in FIG. 9 to the table illustrated in FIG. 13, the operations carried out by the determination unit 1302 are the same. In other words, to which of the sickness-inducing movements indicated in FIG. 13 the movement of the HMD user's head, based on the position and attitude, angular velocity, and acceleration received from the calculation unit 1212, corresponds is determined according to the detection order.

The present embodiment differs from the first embodiment in that the HMD 1101 carries out the following processing in step S1702 and step S1705 of the flowchart in FIG. 7.

In step S1702, the attitude sensor unit 1203 measures and obtains its own attitude information, acceleration, and angular velocity. The calculation unit 1212 finds the position of the image capturing unit 1202 from the image captured by the image capturing unit 1202, finds the attitude of the image capturing unit 1202 from the attitude information from the attitude sensor unit 1203, and sends the position and attitude of the image capturing unit 1202 to the image processing device 1104 via the communication unit 1204.

Figure 14:
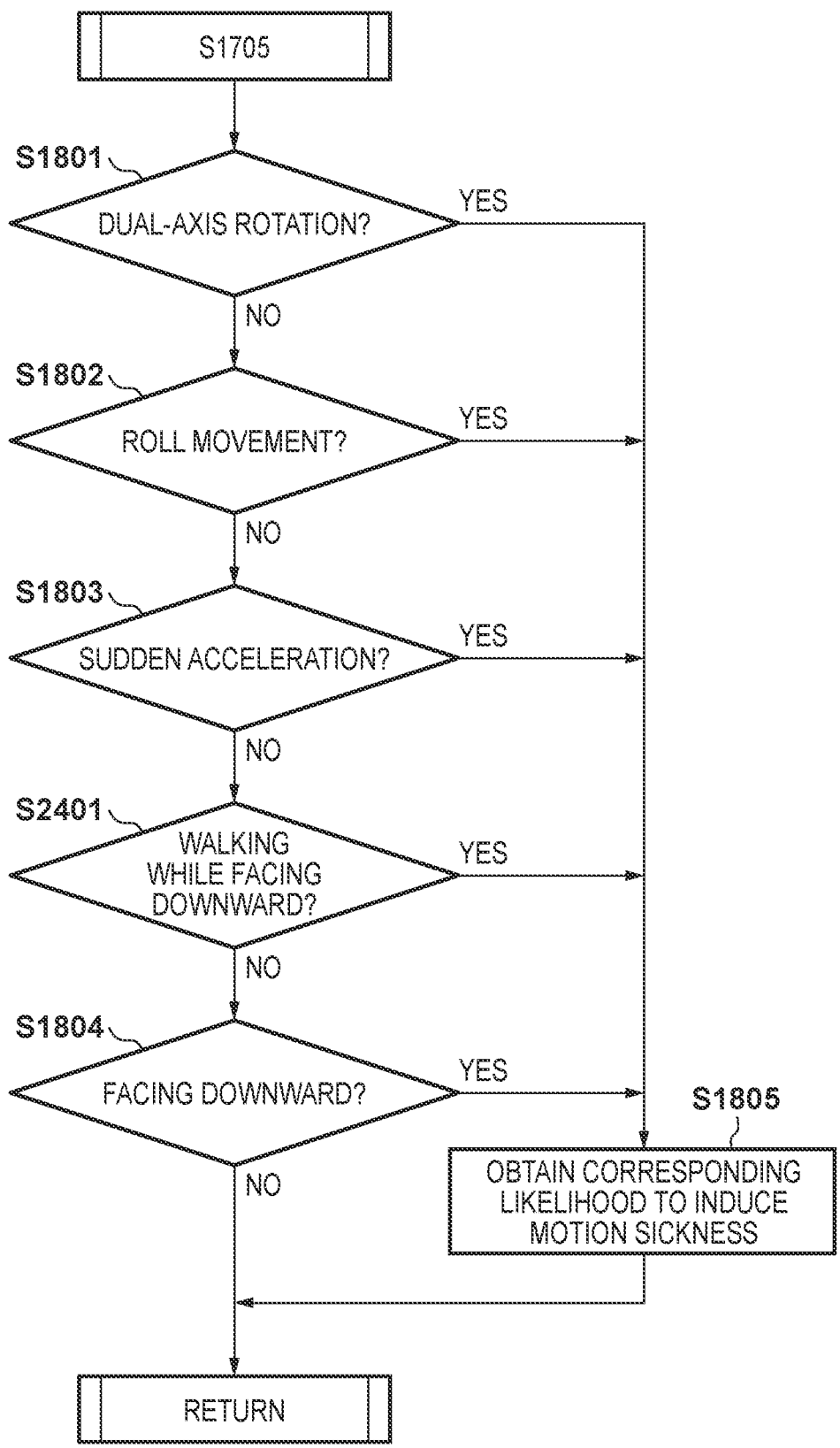
FIG. 14 is a flowchart illustrating details of the process of step S1705.

In step S1705, processing is carried out according to the flowchart in FIG. 14. Steps S1801 to S1804 differ from the first embodiment in that the table in FIG. 13 is used instead of the table in FIG. 9.

In step S1803, if the determination unit 1302 has determined that some or all of the measurement results from the attitude sensor unit 1203 do not satisfy the condition corresponding to the sickness-inducing movement of "sudden acceleration", the process moves to step S2401.

In step S2401, the determination unit 1302 determines whether or not some or all of the position and attitude, acceleration, and angular velocity obtained from the calculation unit 1212 satisfy a condition corresponding to the sickness-inducing movement of "walking while facing downward", which has a detection order of "4" in the table held by the movement definition unit 1301 and illustrated in FIG. 13.

Assume that it has been determined that some or all of the position and attitude, acceleration, and angular velocity obtained from the calculation unit 1212 satisfy the condition corresponding to the sickness-inducing movement of "walking while facing downward". At this time, the determination unit 1302 determines that the movement of the HMD 1101 (the head) is "walking while facing downward", and the process moves to step S1805. However, if some or all of the position and attitude, acceleration, and angular velocity obtained from the calculation unit 1212 do not satisfy the condition corresponding to the sickness-inducing movement of "walking while facing downward", the process moves to step S1804. In step S1804, the determination unit 1302 determines whether or not some or all of the measurement results obtained by the attitude sensor unit 1203 satisfy a condition corresponding to the sickness-inducing movement of "facing downward", which has a detection order of "5" in the table held by the movement definition unit 1301 and illustrated in FIG. 13.

Third Embodiment

Figure 15:
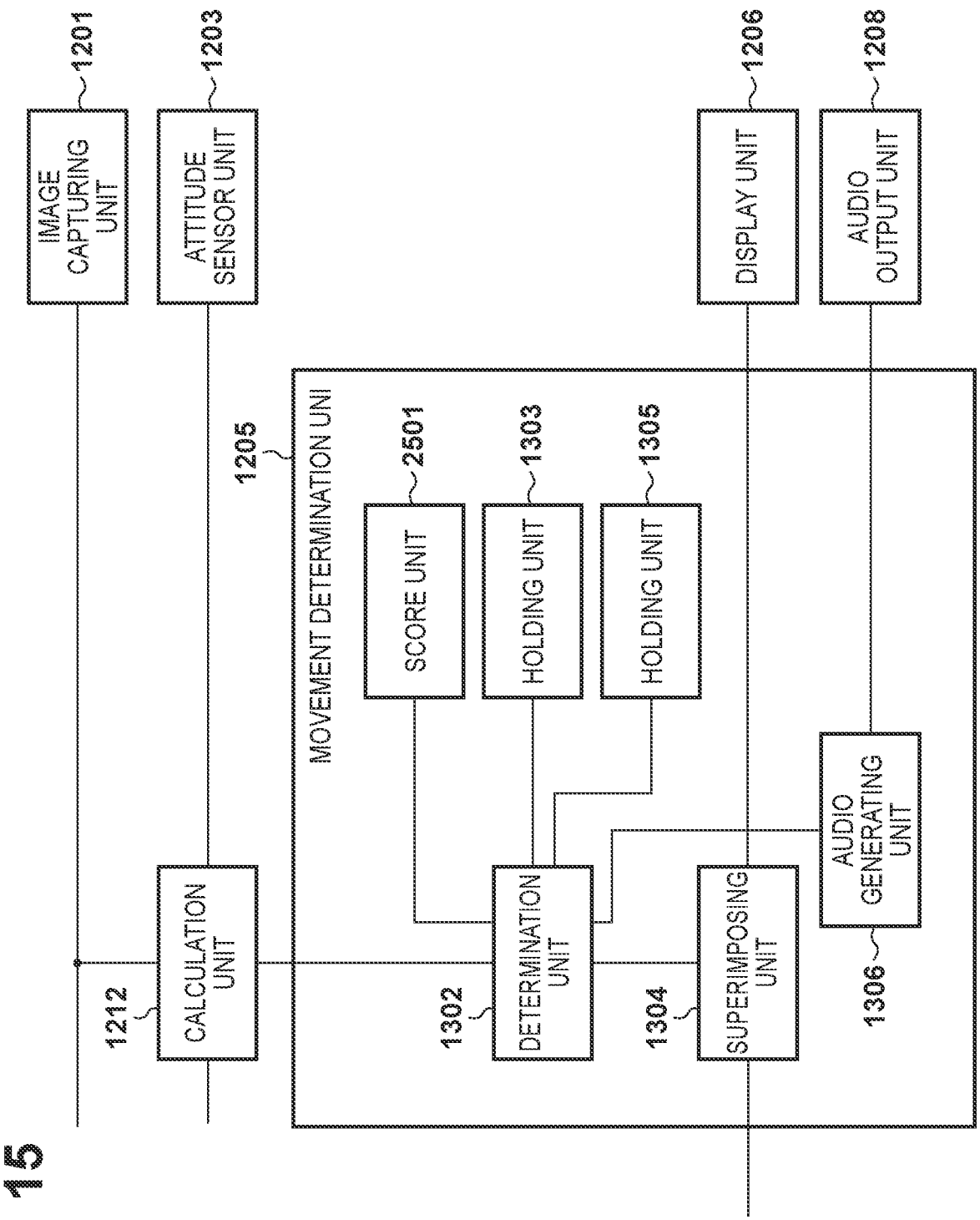
FIG. 15 is a block diagram illustrating an example of the functional configuration of the movement determination unit 1205.

An example of the functional configuration of the movement determination unit 1205 according to the present embodiment will be described with reference to the block diagram in FIG. 15. A score unit 2501 holds a table which holds a score for each sickness-inducing movement in addition to the likelihood to induce motion sickness and the detection order. FIG. 16 illustrates an example of the configuration of a table held in the score unit 2501.

The table illustrated in FIG. 16 adds a "score" item to the table of FIG. 13, and a score corresponding to each sickness-inducing movement is registered. In the table in FIG. 16, scores of "0.5", "5", "1", "10", and "1" are registered as scores for the sickness-inducing movements "facing downward", "roll movement", "sudden acceleration", "dual-axis rotation", and "walking while facing downward", respectively.

In the present embodiment, each time it is determined that the movement of the HMD 1101 corresponds to a sickness-inducing movement, the determination unit 1302 obtains the score corresponding to that sickness-inducing movement and cumulates the obtained score. When the sum of the cumulated score (a cumulative score) becomes greater than or equal to a prescribed value, the determination unit 1302 outputs text information, audio data, or the like to notify of a warning. After the warning has been notified, the determination unit 1302 resets the cumulative score to 0. Note that the cumulative score is also reset to 0 when the HMD 1101 is started up.

For example, as illustrated in FIG. 17, when the movement of the HMD 1101 is determined to be normal movement up until time t, and the movement of the HMD 1101 is determined to be the sickness-inducing movement "roll movement" at time t, the corresponding score of "5" is obtained from the table in FIG. 16. The sum of the cumulated score (the cumulative score) is "5" at this point in time. When the movement of the HMD 1101 is then determined to be the sickness-inducing movement "sudden acceleration" at time (t+1), the corresponding score of "1" is obtained from the table in FIG. 16, and the cumulative score is therefore "6" at this point in time. When the movement of the HMD 1101 is then determined to be the sickness-inducing movement "sudden acceleration" at time (t+2), the corresponding score of "1" is obtained from the table in FIG. 16, and the cumulative score is therefore "7" at this point in time. When the movement of the HMD 1101 is then determined to be the sickness-inducing movement "sudden acceleration" at time (t+3), the corresponding score of "1" is obtained from the table in FIG. 16, and the cumulative score is therefore "8" at this point in time. When the movement of the HMD 1101 is then determined to be the sickness-inducing movement "sudden acceleration" at time (t+4), the corresponding score of "1" is obtained from the table in FIG. 16, and the cumulative score is therefore "9". When the movement of the HMD 1101 is then determined to be the sickness-inducing movement "walking while facing downward" at time (t+5), the corresponding score of "1" is obtained from the table in FIG. 16, and the cumulative score is therefore "10". Here, if the prescribed value is set to "10", the cumulative score has become greater than or equal to the prescribed value at time (t+5), and thus the determination unit 1302 outputs text information, audio data, or the like in order to notify of a warning.

Note that times t, (t+1), (t+2), and so on do not represent sequential discrete times, but rather represent the times at which the movement of the HMD 1101 has been determined to correspond to one of the sickness-inducing movements.

Figure 18:
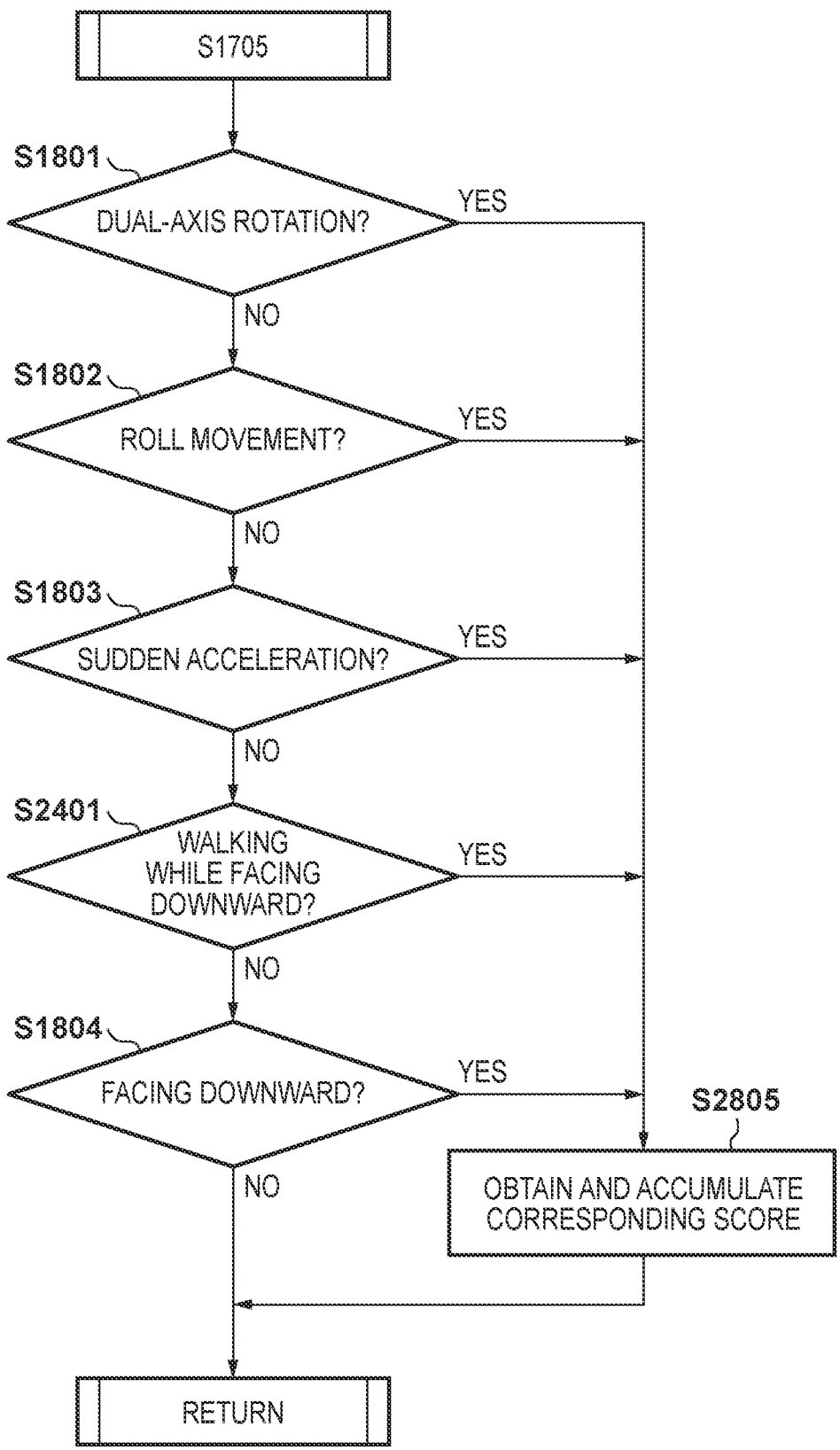
FIG. 18 is a flowchart illustrating details of the process of step S1705.

In the present embodiment, the flowchart in FIG. 7 differs from that described in the first embodiment as follows. Step S1702 according to the present embodiment is the same as step S1702 according to the second embodiment. In step S1705, processing is carried out according to the flowchart in FIG. 18. In step S2805, the determination unit 1302 obtains and cumulates the score corresponding to the sickness-inducing movement corresponding to the movement of the HMD 1101 (the head). If the cumulative score is greater than or equal to the prescribed value, the determination unit 1302 determines that the movement of the HMD 1101 (the head) is not normal movement, whereas if the cumulative score is less than the prescribed value, the determination unit 1302 determines that the movement of the HMD 1101 (the head) is normal movement. The process then moves to step S1706.

Furthermore, in the present embodiment, steps S1708 and S1709 are deleted from the flowchart in FIG. 7, and when the movement of the HMD 1101 (the head) is not normal movement, the process moves to step S1710 through step S1706. In the present embodiment, the holding unit 1303 stores one type of warning message, and thus in step S1710 according to the present embodiment, the determination unit 1302 obtains that message from the holding unit 1303 and sends the message to the superimposing unit 1304.

Fourth Embodiment

In the first to third embodiments, the warning is notified in accordance with the movement of the HMD user's head, regardless of who the HMD user is. However, there are significant individual differences with respect to visually-induced motion sickness; for example, some people are more likely to feel sick when wearing the HMD and walking while facing downward, whereas some people are less likely to feel sick when walking while facing downward. In light of this, in the present embodiment, the score described in the third embodiment is managed for each user or for each of the user attributes. The score corresponding to the HMD user is then used to calculate the cumulative score. Differences from the third embodiment will be described hereinafter.

Figure 19:
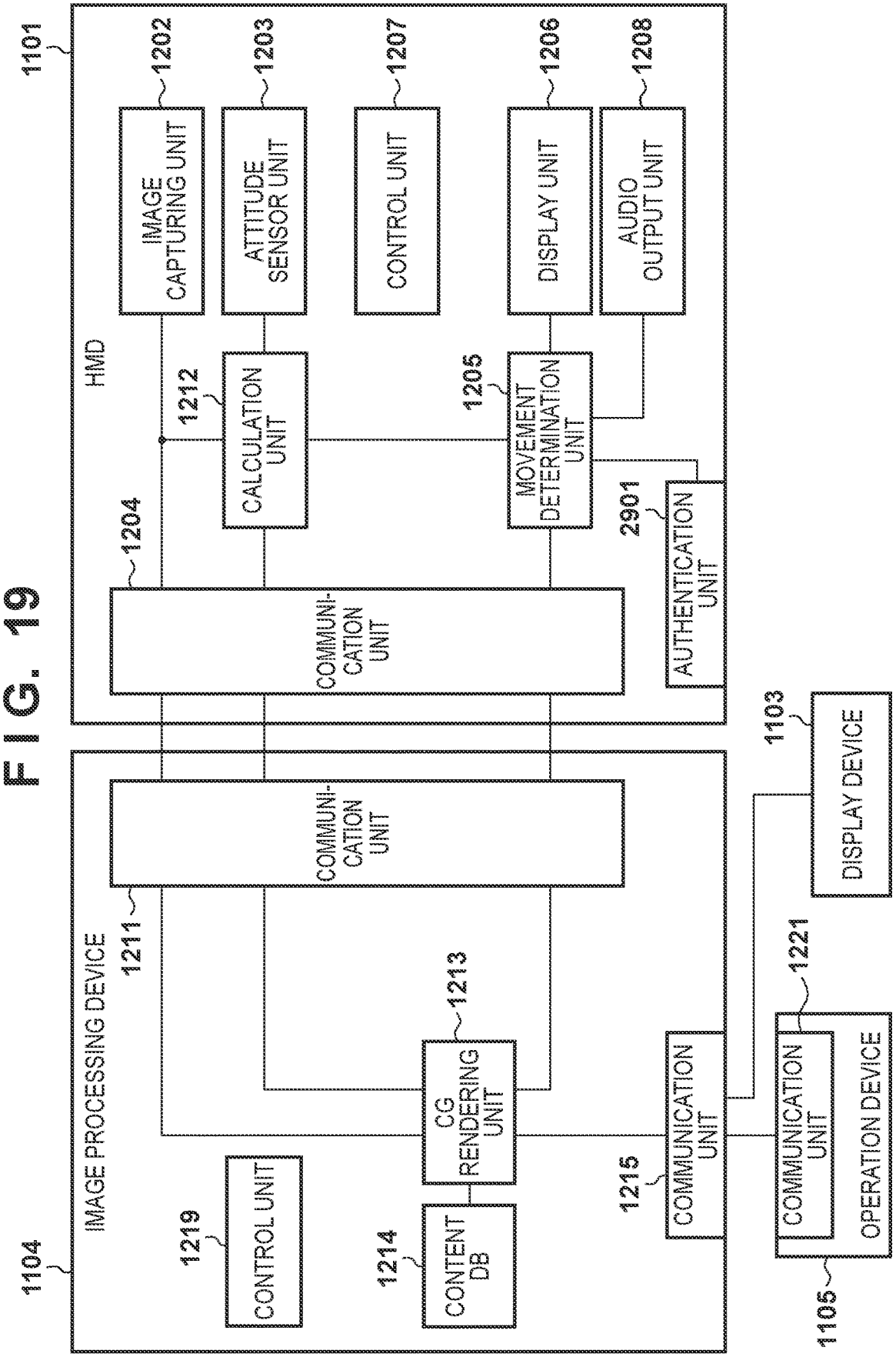
FIG. 19 is a block diagram illustrating an example of the functional configurations of the HMD 1101 and the image processing device 1104.

An example of the functional configurations of the HMD 1101 and the image processing device 1104 will be described next with reference to the block diagram in FIG. 19. The configuration of FIG. 19 adds an authentication unit 2901 to the configuration of the HMD 1101 of FIG. 10. The authentication unit 2901 is a unit for identifying the user wearing the HMD 1101, and any configuration can be employed as long as it is a configuration capable of such identification. For example, the authentication unit 2901 may uniquely identify a user by authenticating the user's iris, fingerprint, or the like. Alternatively, an operation unit which enables the user to input his or her own user ID and password may be provided in the HMD 1101, and the authentication unit 2901 may uniquely identify the user by authenticating the user ID and password input by the user operating the operation unit. The authentication unit 2901 identifies the user wearing the HMD 1101 on his or her head before the user uses the HMD 1101. Then, the authentication unit 2901 sends information unique to the identified user (user information) to the movement determination unit 1205.

Figure 20:
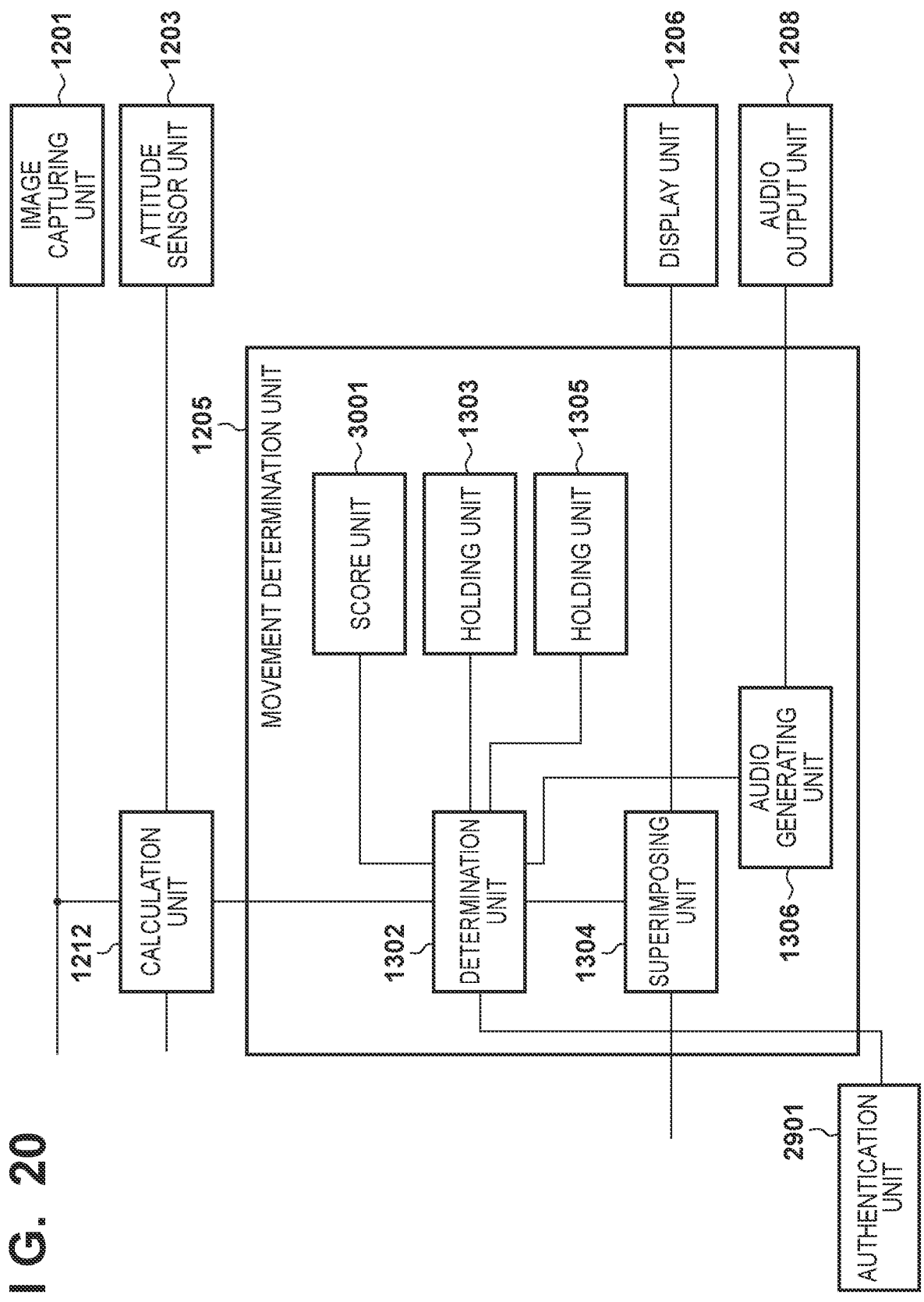
FIG. 20 is a block diagram illustrating an example of the functional configuration of the movement determination unit 1205.

An example of the functional configuration of the movement determination unit 1205 will be described with reference to the block diagram in FIG. 20. The configuration of FIG. 20 corresponds to the configuration of FIG. 15, but with an output (the user information) from the authentication unit 2901 being input to the determination unit 1302, and a score unit 3001 being provided instead of the score unit 2501.

The score unit 3001 holds a table managing the likelihood to induce motion sickness, the detection order, and the score for each sickness-inducing movement, such as that illustrated in FIG. 16, on a user-by-user basis. FIG. 21A illustrates an example of the configuration of information held in the score unit 3001.

The table illustrated in FIG. 21A is an example of the table managing the sickness-inducing movement, the likelihood to induce motion sickness, the detection order, and the score for each user. In FIG. 21A, the table manages the sickness-inducing movement, the likelihood to induce motion sickness, the detection order, and the score for a user A, and the sickness-inducing movement, the likelihood to induce motion sickness, the detection order, and the score for a user B. In the table of FIG. 21A, "sudden acceleration" and "dual-axis rotation" are assigned a higher score for user A than for user B, and "walking while facing downward" is assigned a lower score for user A than for user B. In other words, this indicates that user A is less likely than user B to feel sick for the movement of "walking while facing downward", and that user B is more likely than user A to feel sick for the movement of "walking while facing downward".

Note that the score unit 3001 may hold the table illustrated in FIG. 21B instead of the table illustrated in FIG. 21A. In FIG. 21B, the table manages user A and user C as "beginners", and user B and user D as "experienced users". This table manages the sickness-inducing movement, the likelihood to induce motion sickness, the detection order, and the score for "beginners", and the sickness-inducing movement, the likelihood to induce motion sickness, the detection order, and the score for "experienced users". Generally speaking, an experienced user is less likely to feel sick, and thus in the example illustrated in FIG. 21B, experienced users are given a lower score. In this manner, the sickness-inducing movement, the likelihood to induce motion sickness, the detection order, and the score may be managed as a set in accordance with user attributes, such as whether the user is a beginner or an experienced user.

Note that the score unit 3001 may hold both the table illustrated in FIG. 21A and the table illustrated in FIG. 21B, and the determination unit 1302 may use one of the tables selected by the user operating the operation device 1105.

In the present embodiment, the authentication unit 2901 obtains the user information of the HMD user and sends that information to the movement determination unit 1205 before processing according to the flowchart of FIG. 7 is started. In the present embodiment, in step S1702 in the flowchart of FIG. 7, the same processing as that carried out in step S1702 according to the second embodiment is performed, and in step S1705, the determination unit 1302 carries out processing according to the flowchart of FIG. 18. However, in step S2805, the determination unit 1302 obtains and cumulates the score corresponding to a set including the user indicated by the user information and the sickness-inducing movement corresponding to the movement of the HMD 1101 (the head). If the cumulative score is greater than or equal to the prescribed value, the determination unit 1302 determines that the movement of the HMD 1101 (the head) is not normal movement, whereas if the cumulative score is less than the prescribed value, the determination unit 1302 determines that the movement of the HMD 1101 (the head) is normal movement. The process then moves to step S1706.

Note that some or all of the embodiments and variations described above may be combined with each other as appropriate. Additionally, some or all of the embodiments and variations described above may be used selectively.

According to the configuration of the present invention, visually-induced motion sickness can be reduced for a user viewing a display device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A head-mounted display device comprising:
one or more processors; and
one or more memories coupled to the one or more processors, the one or more memories having stored therein instructions which, when executed by the one or more processors, cause the device to:
(1) detect movement of a head of a user of the head-mounted display device;
(2) determine whether the detected movement of the head of the user belongs to one of a plurality of types of sickness-inducing movements;
(3) determine a degree of inducing motion sickness for a determined type of sickness-inducing movement if the detected movement of the head of the user is determined to belong to one of the plurality of types of sickness-inducing movements; and
(4) notify the user of the head-mounted display device of a warning corresponding to the determined degree of inducing motion sickness,
wherein the plurality of types of sickness-inducing movements include an operation of rotating about two different axes.

2. The head-mounted display device according to claim 1, wherein the determining whether the detected movement of the head of the user belongs to one of the plurality of types of sickness-inducing movements is performed in order from a type of sickness-inducing movement, among the plurality of types of sickness-inducing movements, that is more likely to induce sickness.

3. The head-mounted display device according to claim 1, wherein the instructions, when executed by the one or more processors, further cause the head-mounted display device to, each time the detected movement of the head of the user is determined to belong to one of the plurality of types of sickness-inducing movements, calculate and cumulate a score corresponding to the determined type of sickness-inducing movement, and
 wherein the notifying notifies the user of the warning when a sum of the cumulated score becomes greater than or equal to a prescribed value.

4. The head-mounted display device according to claim 3, wherein the score corresponding to the operation of rotating about two different axes is higher than the score corresponding to an operation of rotating in a roll direction.

5. The head-mounted display device according to claim 1, wherein the instructions, when executed by the one or more processors, further cause the head-mounted display device to, each time the detected movement of the head of the user is determined to belong to one of the plurality of types of sickness-inducing movements, calculate and cumulate a score corresponding to a combination of (i) the determined type of sickness-inducing movement and (ii) the user of the head-mounted display device, and
 wherein the notifying notifies the user of the warning when a sum of the cumulated score becomes greater than or equal to a prescribed value.

6. The head-mounted display device according to claim 5, wherein the score corresponding to the operation of rotating about two different axes is higher than the score corresponding to an operation of rotating in a roll direction.

7. The head-mounted display device according to claim 1, wherein the instructions, when executed by the one or more processors, cause the head-mounted display device to:
 capture an image; and
 obtain a composite image that is a composite of (i) an image of a virtual space based on a position and attitude of the head-mounted display device and (ii) the captured image,
 wherein the warning is notified by (i) superimposing information indicating the warning on the composite image and (ii) displaying the composite image on which the information is superimposed.

8. The head-mounted display device according to claim 1, wherein the warning is notified by outputting audio indicating the warning.

9. The head-mounted display device according to claim 1, wherein the movement of the head of the user is detected based on at least one of an attitude, an acceleration, an angular velocity, and a position of the head-mounted display device.

10. The head-mounted display device according to claim 1, wherein the operation of rotating about two different axes includes an operation of rotating in both a pan direction and a tilt direction.

11. The head-mounted display device according to claim 1, wherein the plurality of types of sickness-inducing movements include an operation of rotating in a roll direction.

12. A control method for a head-mounted display device, the method comprising:
 detecting movement of a head of a user of the head-mounted display device;
 determining whether the detected movement of the head of the user belongs to one of a plurality of types of sickness-inducing movements;
 determining a degree of inducing motion sickness for a determined type of sickness-inducing movement if the detected movement of the head of the user is determined to belong to one of the plurality of types of sickness-inducing movements; and
 notifying the user of the head-mounted display device of a warning corresponding to the determined degree of inducing motion sickness,
 wherein the plurality of types of sickness-inducing movements include an operation of rotating about two different axes.

13. The control method for a head-mounted display device according to claim 12, wherein the determining whether the detected movement of the head of the user belongs to one of the plurality of types of sickness-inducing movements is performed in order from a type of sickness-inducing movement, among the plurality of types of sickness-inducing movements, that is more likely to induce sickness.

14. The control method for a head-mounted display device according to claim 12, wherein each time the detected movement of the head of the user is determined to belong to one of the plurality of types of sickness-inducing movements, a score corresponding to the determined type of sickness-inducing movement is calculated and cumulated, and
 wherein the warning is notified in the notifying when a sum of the cumulated score becomes greater than or equal to a prescribed value.

15. The control method for a head-mounted display device according to claim 12, wherein each time the detected movement of the head of the user is determined to belong to one of the plurality of types of sickness-inducing movements, a score corresponding to a combination of (i) the determined type of sickness-inducing movement and (ii) the user of the head-mounted display device is calculated and cumulated, and
 wherein the warning is notified in the notifying when a sum of the cumulated score becomes greater than or equal to a prescribed value.

16. The control method for a head-mounted display device according to claim 12, further comprising obtaining a composite image that is a composite of (i) an image of a virtual space based on a position and attitude of the head-mounted display device and (ii) the captured image,
 wherein in the notifying, the warning is notified by (i) superimposing information indicating the warning on the composite image and (ii) displaying the composite image on which the information is superimposed.

17. The control method for a head-mounted display device according to claim 12, wherein the warning is notified in notifying by outputting audio indicating the warning.

18. The control method for a head-mounted display device according to claim 12, wherein the movement of the head of the user is detected based on at least one of an attitude, an acceleration, an angular velocity, and a position of the head-mounted display device.

* * * * *